(12) United States Patent
Constantz et al.

(10) Patent No.: US 11,181,700 B2
(45) Date of Patent: Nov. 23, 2021

(54) CARBON SEQUESTRATION METHODS AND SYSTEMS

(71) Applicant: Blue Planet Systems Corporation, Los Gatos, CA (US)

(72) Inventors: Brent R. Constantz, Portola Valley, CA (US); Mark A. Bewernitz, Los Gatos, CA (US)

(73) Assignee: Blue Planet Systems Corporation, Los Gatos, CA (US)

( * ) Notice: Subject to any disclaimer, the term of this patent is extended or adjusted under 35 U.S.C. 154(b) by 278 days.

(21) Appl. No.: 16/219,578

(22) Filed: Dec. 13, 2018

(65) Prior Publication Data

US 2019/0187386 A1 Jun. 20, 2019

Related U.S. Application Data

(62) Division of application No. 14/861,996, filed on Sep. 22, 2015, now Pat. No. 10,197,747.

(Continued)

(51) Int. Cl.
*B01D 53/62* (2006.01)
*B01D 53/73* (2006.01)
(Continued)

(52) U.S. Cl.
CPC .......... *G02B 6/3885* (2013.01); *B01D 53/62* (2013.01); *B01D 53/73* (2013.01); *B01D 53/78* (2013.01);
(Continued)

(58) Field of Classification Search
CPC ........ B01D 2251/304; B01D 2251/306; B01D 2251/402; B01D 2251/404; B01D 2251/60; B01D 2257/302; B01D 2257/404; B01D 2257/504; B01D 2257/60; B01D 2257/602; B01D 2257/708; B01D 2258/0283;
(Continued)

(56) References Cited

U.S. PATENT DOCUMENTS

| 2009/0062593 | A1* | 3/2009 | Bruno | E21B 41/0064 588/250 |
| 2014/0234946 | A1* | 8/2014 | Constantz | B01D 53/78 435/266 |

(Continued)

FOREIGN PATENT DOCUMENTS

| WO | 2014/039578 A1 | 3/2014 |
| WO | 2014/144848 A1 | 9/2014 |
| WO | 2015/134408 A1 | 9/2015 |

*Primary Examiner* — Cabrena Holecek
(74) *Attorney, Agent, or Firm* — Michael J. Blessent; Bret E. Field; Bozicevic, Field & Francis LLP

(57) ABSTRACT

Methods of sequestering carbon dioxide ($CO_2$) are provided. Aspects of the methods include contacting a $CO_2$ containing gaseous stream with an aqueous medium under conditions sufficient to produce a bicarbonate rich product. The resultant bicarbonate rich product (or a component thereof) is then combined with a cation source under conditions sufficient to produce a solid carbonate composition and product $CO_2$ gas, followed by injection of the product $CO_2$ gas into a subsurface geological location to sequester $CO_2$. Also provided are systems configured for carrying out the methods.

17 Claims, 13 Drawing Sheets

Related U.S. Application Data

(60) Provisional application No. 62/054,322, filed on Sep. 23, 2014.

(51) Int. Cl.
  *B01D 53/78* (2006.01)
  *B65G 5/00* (2006.01)
  *C01B 32/50* (2017.01)
  *C01B 32/60* (2017.01)
  *G02B 6/38* (2006.01)
  *G02B 6/44* (2006.01)

(52) U.S. Cl.
  CPC ............ *B65G 5/00* (2013.01); *C01B 32/50* (2017.08); *C01B 32/60* (2017.08); *G02B 6/4463* (2013.01); *B01D 2251/304* (2013.01); *B01D 2251/306* (2013.01); *B01D 2251/402* (2013.01); *B01D 2251/404* (2013.01); *B01D 2251/60* (2013.01); *B01D 2257/302* (2013.01); *B01D 2257/404* (2013.01); *B01D 2257/504* (2013.01); *B01D 2257/60* (2013.01); *B01D 2257/602* (2013.01); *B01D 2257/708* (2013.01); *B01D 2258/0283* (2013.01); *Y02C 20/40* (2020.08); *Y02P 20/151* (2015.11)

(58) Field of Classification Search
  CPC ........ B01D 53/62; B01D 53/73; B01D 53/78; B65G 5/00; C01B 32/50; C01B 32/60; G02B 6/3885; G02B 6/4463; Y02C 10/04; Y02C 10/14; Y02C 20/40; Y02P 20/151; Y02P 20/152
  See application file for complete search history.

(56) References Cited

U.S. PATENT DOCUMENTS

2015/0246314 A1* 9/2015 Constantz .............. B01D 53/62
  423/220
2017/0361270 A1* 12/2017 Constantz .............. B01D 53/62

\* cited by examiner

E  Reaction 1: CaCl$_2$(aq)+2NaHCO$_3$(aq) ↔ CaCO$_3$(s)+CO$_2$(g)+H$_2$O+2NaCl(aq)
   Reaction 2: CaCl$_2$(aq)+Na$_2$CO$_3$(aq) ↔ CaCO$_3$+2NaCl(aq)

CARBON SEQUESTRATION METHODS AND SYSTEMS

CROSS-REFERENCE TO RELATED APPLICATION

This application is division of U.S. patent application Ser. No. 14/861,996 filed on Sep. 22, 2015, now issued as U.S. Pat. No. 10,197,747, which application, pursuant to 35 U.S.C. § 119(e), claims priority to the filing date of U.S. Provisional Application Ser. No. 62/054,322 filed on Sep. 23, 2014; the disclosure of which applications are herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. Because human activities since the industrial revolution have rapidly increased concentrations of atmospheric $CO_2$, anthropogenic $CO_2$ has been implicated in global warming and climate change, as well as increasing oceanic bicarbonate concentration. Ocean uptake of fossil fuel $CO_2$ is now proceeding at about 1 million metric tons of $CO_2$ per hour.

Concerns over anthropogenic climate change and ocean acidification, compounded with recent changes in U.S. Federal policy to include carbon dioxide ($CO_2$) as a regulated air pollutant, have fueled an urgency to discover scalable, cost effective, methods of carbon capture and sequestration (CCS). Typically, methods of CCS separate pure $CO_2$ from complex flue streams, compress the purified $CO_2$, and finally inject it into underground saline reservoirs for geologic sequestration. These multiple steps are very energy and capital intensive.

SUMMARY

Methods of sequestering carbon dioxide ($CO_2$) are provided. Aspects of the methods include contacting a $CO_2$ containing gaseous stream with an aqueous medium under conditions sufficient to produce a bicarbonate rich product. The resultant bicarbonate rich product (or a component thereof) is then combined with a cation source under conditions sufficient to produce a solid carbonate composition and product $CO_2$ gas, followed by injection of the product $CO_2$ gas into a subsurface geological location to sequester $CO_2$. Also provided are systems configured for carrying out the methods.

Figure 1:
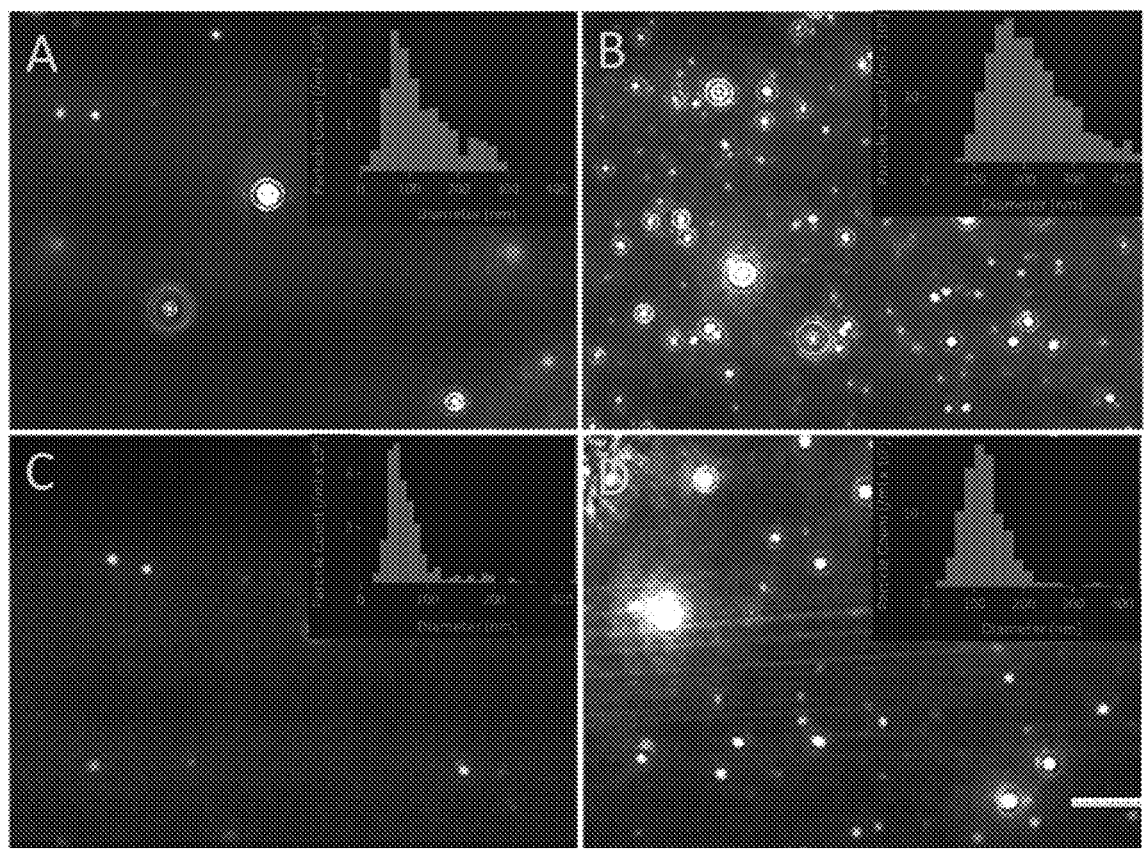
FIG. 1. Size distribution of LCP droplets in various solutions at 25° C., as determined by nanoparticle tracking analysis (NTA). NTA is preferred over dynamic light scattering in characterizing the particle size distribution of LCP due to its sensitivity to dilute concentrations and its spatial resolution, and has proven successful in detecting LCP in the past. These data suggest that LCP is a common, ubiquitous phase that is expected to affect carbonate chemistry in many different $CO_2$-containing aqueous systems and does not require the presence of $Ca^{2+}$ and/or $Mg^{2+}$. (A) Simulated Cretaceous seawater at roughly seven times atmospheric $P_{CO2}$; measured DIC=1.8 mM carbon. In the geologic record, Earth's most significant and abundant carbonate rock formations are limestones resulting from calcium carbonate biomineralization produced by calcifying marine taxa which were prolific during this Period, when atmospheric carbon dioxide concentration was significantly higher (16). (B) Sand-filtered, modern seawater from Monterey Bay, Calif.; measured DIC=1.7 mM carbon. (C) Simple synthetic LCP-containing solution consisting of 100 mM $NaHCO_3$ and 100 mM NaCl (D) Fetal Bovine Serum, 1/100 diluted in deionized water and filtered through a 200 nm syringe filter; measured DIC=0.5 mM carbon. (Insets) Size distributions of the detected scattering events (LCP droplets) in the respective data set.

The asymmetrical C—O stretching of the carbonate bond, v3, is seen shifting through a bidentate, resulting in a characteristic calcite peak suggesting that calcium carbonate formation may be forming through a bicarbonate pathway similar to one proposed in nature (I. Zondervan, R. E. Zeebe, B. Rost, U. Riebesell, Decreasing marine biogenic calcification: A negative feedback on rising atmospheric pCO2. Global Biogeochemical Cycles 15, 507 (2001)). The symmetric carbonate vibrational mode, v1, relates to free carbonate available in the structure. Out of plane bending, v2, and in plane bending, v4, are identified by (877 cm−1) and (714 cm−1) respectively. (B) A FTIR spectra identifying $CaCO_3$ (calcite) formed by LCP Reaction 1, and Reaction 2. The end product of both pathways appears to be identical. (C) A nanoparticle tracking analysis (NTA) still-shot image of 0.25M $NaHCO_3$. Bicarbonate-rich liquid condensed phase droplets can be seen. (D) A NTA still-shot image of a reaction 1 immediately post mixing provides a visualization of what is measured in time-resolve fashion in part A. (E) The chemical pathway of LCP-driven low pH reaction (Reaction 1) vs. conventional high pH reaction (Reaction 2), (F) The measured yields of reaction 1 vs. reaction 2, with respect to $CaCO_3$ and $CO_2$, as determined by DIC analysis. The results reinforce the difference between reaction 1 and reaction 2 pathways due to differences in evolved CO2 (expected for reaction 1). (G) The time-resolved pH response of reaction 1 dump reaction shows an initial drop in pH, presumably due to removal of bicarbonate. (H) The time-resolved pH response of reaction 2 dump reaction shows little pH drop suggesting that carbonates are being consumed during mineral formation and are buffered by bicarbonates. During the reaction of carbonate formation, liquid condensed phases (LCP) evolve in the presence of calcium ion and nucleating to form $CaCO_3$. As $CaCO_3$ precipitation proceeds, dehydration of the reaction product occurs as seen by the drop of δ O—H vibrational peak. According to FTIR spectra in FIG. S5A, the structures were initially hydrated and amorphous as reported previously, showing broad peaks in the observed range (K. Naka, Y. Tanaka, Y. Chujo, Effect of Anionic Starburst Dendrimers on the Crystallization of CaCO3 in Aqueous Solution: Size Control of Spherical Vaterite Particles. Langmuir 18, 3655 (2002); L. Addadi, S. Raz, S. Weiner, Taking advantage of disorder: amorphous calcium carbonate and its roles in biomineralization. Adv. Mater. 15, 959 (2003)). As the reaction progresses, however, gradual appearance of sharp peaks are related to the development of crystalline structure of the carbonate polymorphs as seen with the increase of 1400 $cm^{-1}$ ($v_3$ asymmetrical $CO_3$), 1087 $cm^{-1}$ ($v_1$ symmetrical $CO_3$), 877 $cm^{-1}$ ($v_2$ out-of-plane band of $CO_3$), and 714 $cm^{-1}$ ($v_4$ in-plane-band of $CO_3$) (J. D. Rodriguez-Blanco, S. Shaw, L. G. Benning, The kinetics and mechanisms of amorphous calcium carbonate (ACC) crystallization to calcite, via vaterite. Nanoscale 3, 265 (2011)), indicating the formation of calcite phase (E. Loste, R. M. Wilson, R. Seshadri, F. C. Meldrum, The role of magnesium in stabilising amorphous calcium carbonate and controlling calcite morphologies. Journal of Crystal Growth 254, 206 (2003)). This particular reaction was denoted as Reaction 1 in the main report and was compared to conventional $CaCO_3$ precipitation pathway, Reaction 2.

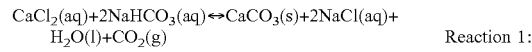
$CaCl_2(aq)+2NaHCO_3(aq) \leftrightarrow CaCO_3(s)+2NaCl(aq)+$
$H_2O(l)+CO_2(g)$      Reaction 1:

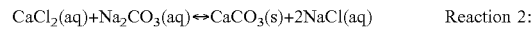
$CaCl_2(aq)+Na_2CO_3(aq) \leftrightarrow CaCO_3(s)+2NaCl(aq)$      Reaction 2:

The products as the result of Reaction 1 and 2 are identical as shown in FIG. S5B. The yield of $CO_2$ and $CaCO_3$ were 90% and 80%, respectively, confirming the stoichiometry and chemical pathway of Reaction 1. pH was also measured in a time-resolved fashion and suggests that reaction 1 occurs at a lower pH compared to the conventional Reaction 2. This is directly related to LCP-formation mechanism as $Ca^{2+}$ has the propensity to interact with $HCO_3^-$, enabling precipitation reaction to take place at neutral pH. In both cases, pHs in the initial stages decrease slightly due to onset of $CaCO_3$ precipitation.

Figure 9:
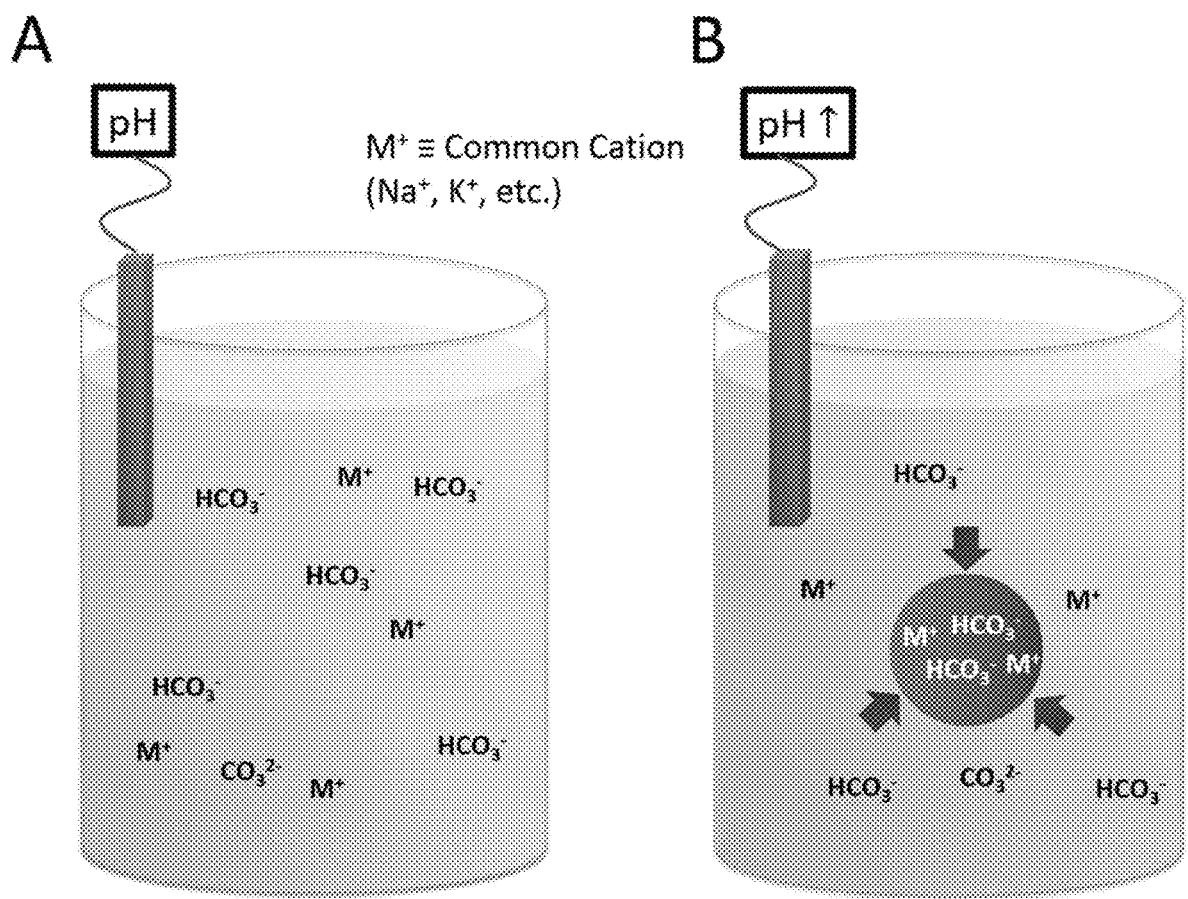

FIG. 9. Illustration depicting how the two-phase bicarbonate-rich LCP system might alter the interpretation of system measurements such as pH. (A) Hypothetical one-phase system, at relatively neutral pH, that consists of $HCO_3^-$ and $CO_3^{2-}$ ions charge balanced with $H^+$ and various $M^{n+}$ cations, e.g., $Na^+$, $K^+$, $Ca^{2+}$, etc. (B) A system containing the same constituents as (A) but now they are arranged in a two-phase system that has bicarbonate-rich LCP, illustrated by the single large droplet. Even though the systems are identical in a global sense (overall DIC and alkalinity), the variables measured only in the bulk of the two-phase system, such as pH, conductivity, and selected ion concentrations, will not reflect the contents of the LCP. This can lead to misinterpretation of the system behavior unless the two-phase system is considered. For this illustration, the pH of the two-phase system would be higher due to the known sequestration of $H^+$ in the LCP, leading to the false conclusion that the overall $HCO_3^-/CO_3^{2-}$ ratio has dropped when, in a global sense, it has remained constant. In a two-phase system, such as one containing bicarbonate-rich LCP, pH and alkalinity are independent due to the presence of an extra degree of freedom.

Figure 10:
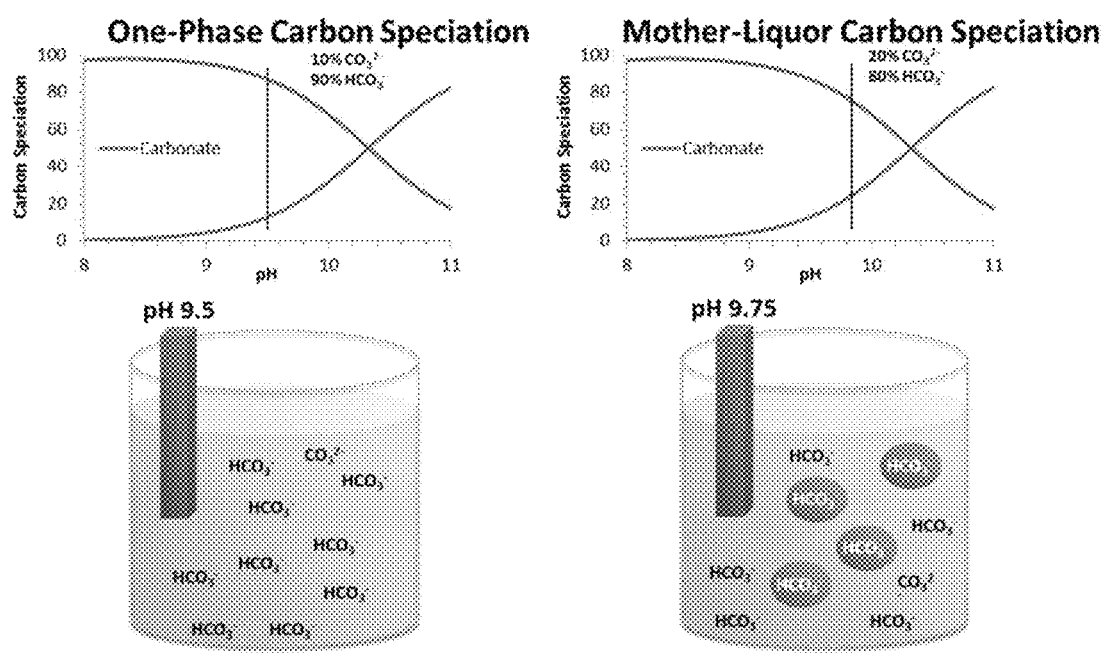

FIG. 10. An illustration of a two phase system that can alter the interpretation of system measurements such as pH. On the left is a hypothetical one phase system which shows speciation ideally to yield a 1:10 carbonate to bicarbonate ratio. The system on the right contains the same constituents as on the left but it is arranged in a two-phase system containing bicarbonate-rich liquid condensed phase droplets within a mother liquor which is at a carbonate-to-bicarbonate ratio of 1:5. Even though the systems are identical in a global sense, the measured pH value is different between the systems which would lead to incorrect interpretations if the two-phase system is not considered.

Figure 11:
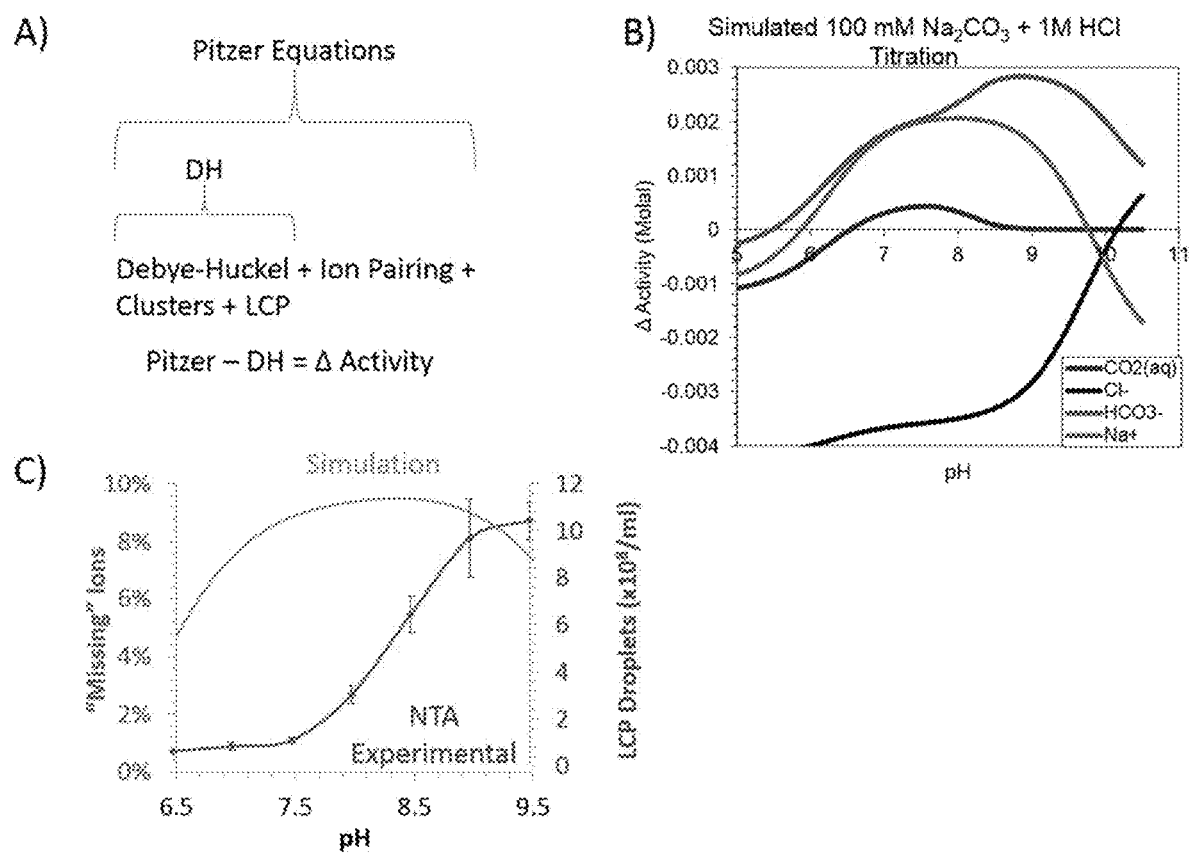

FIG. 11. The concentration of bicarbonate-rich liquid LCP droplets (as measured by nanoparticle tracking analysis) qualitatively matches the activity drop of ions predicted from our thermodynamic analysis. (A) Pitzer equations model bicarbonate solutions empirically which considers all of the known contributions to activity loss. Debye-Huckel, models only consider columbic interactions. By subtracting the activities predicted by Pizter Equations from those predicted by D-H theory, we isolate the activity loss of ions due to bicarbonate-rich LCP. Ion pairing and prenucleation clustering is negligible due to the neutral pH, lack of divalent ions, and the weak ion associations known for all three ions ($Na^+$, $Cl^-$, $HCO_3^-$). (B) The difference in ion activity between actual ion activities (approximated using Pitzer's equations) and that predicted by Debye-Hückel theory for a 50 mM $NaHCO_3$ with varying amounts of HCl added to adjust pH. Species with positive deviations (lower activities) are interpreted as strong candidates to be participating in the LCP phase. Negative deviations are interpreted to be species that are relatively enriched in the bulk phase and are excluded from the LCP. The composition of the LCP phase is then the sum of the positive deviations of the curves, which provides the amounts of species missing from bulk solution (C) The comparison of measured LCP droplet concentrations via NTA vs. the predicted percent of ions participating in LCP as predicted from part B. The NTA experimental data was collected in triplicate and is presented as an average with a standard deviation of error in either direction. The amount of LCP droplets detected by NTA decreases in a way qualitatively similar to our prediction. The drop in concentration of LCP droplets detected occurs more rapidly than the drop according to the Pitzer equations. This suggests that the LCP droplets may be smaller as well as fewer as the pH is lowered and therefore are not being detected by the NTA (which has a size detection lower limit of 40 nm). We speculate that there may be a spinodal for the LCP below pH 7.5. This would be consistent with an LCP phase that is bicarbonate-rich and slightly acidic as reported previously as the energy of interfacial formation would be reduced in this environment.

Figure 12:
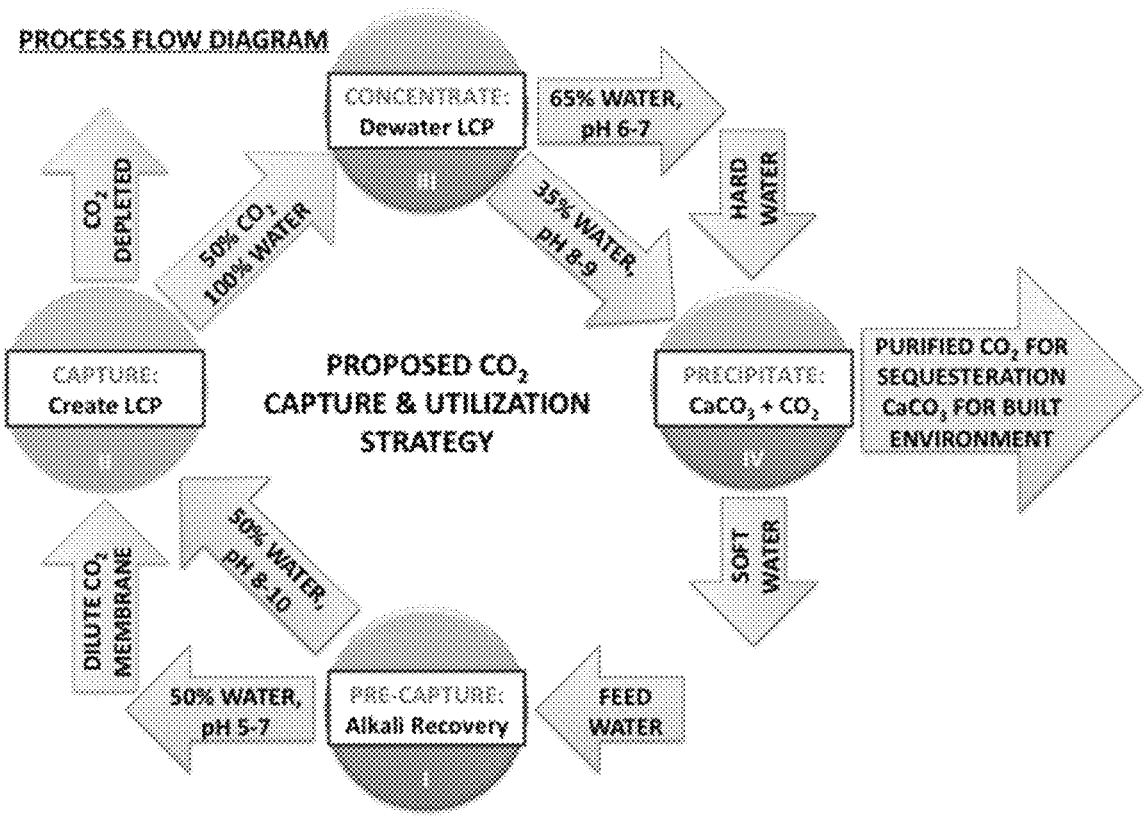

FIG. 12. A flow process diagram illustrating the proposed carbon sequestration mechanism allowed by the discovery of bicarbonate-rich LCP. The four stages of the process are: (I) Pre-Capture: the creation of the $CO_2$ capture solution, (II) Capture: the capture solution is contacted with flue gas, (III) Concentrate: dilute solutions of LCP are concentrated by membrane dewatering, and (IV) Precipitate: a hard water source is combined with the concentrated LCP solution to precipitate synthetic limestone (calcium carbonate, $CaCO_3$).

Figure 13:
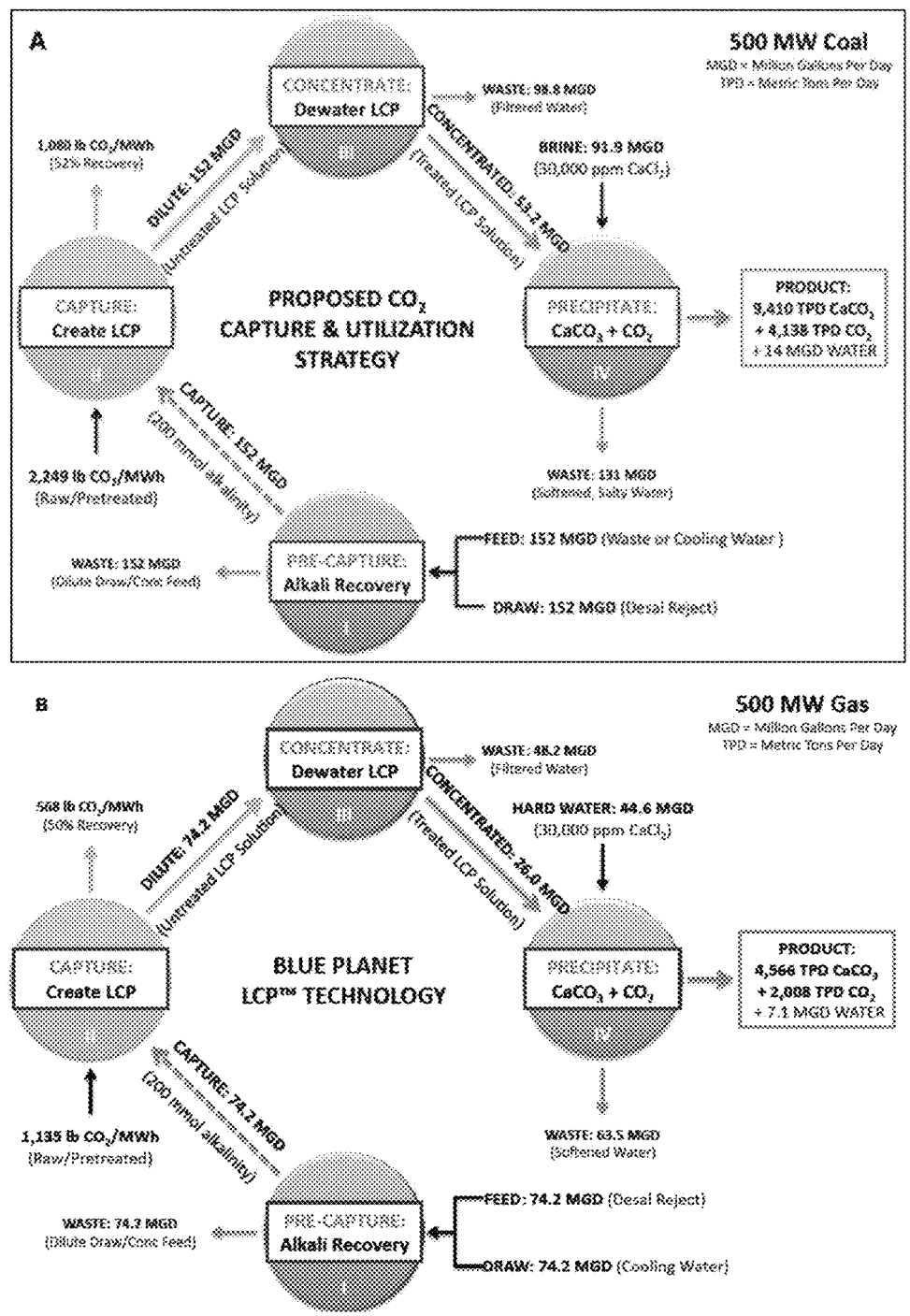

FIG. 13. Models for the LCP Technology in place at a 500 MW power plant. (A) Coal-fired power plant. (B) Natural gas-fired power plant. Each case assumes the solution developed at the Pre-Capture stage will have 200 mmol alkalinity available to capture $CO_2$, and that the $CaCO_3$ precipitation occurs by reaction of one equivalent of $Ca^{2+}$ with two equivalents of $HCO_3^-$.

DETAILED DESCRIPTION

Methods of sequestering carbon dioxide ($CO_2$) are provided. Aspects of the methods include contacting a $CO_2$ containing gaseous stream with an aqueous medium under conditions sufficient to produce a bicarbonate rich product. The resultant bicarbonate rich product (or a component thereof) is then combined with a cation source under conditions sufficient to produce a solid carbonate composition and product $CO_2$ gas, followed by injection of the product $CO_2$ gas into a subsurface geological location to sequester $CO_2$. Also provided are systems configured for carrying out the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, aspects of the invention include $CO_2$ sequestration processes, i.e., processes (methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ by producing a substantially pure subsurface injectable CO2 product gas and a storage stable carbon dioxide sequestering product from an amount of $CO_2$, such that the $CO_2$ is sequestered. The storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Aspects of such protocols include contacting a $CO_2$ containing gas with an aqueous medium to remove $CO_2$ from the $CO_2$ containing gas. The $CO_2$ containing gas may be pure $CO_2$ or be combined with one or more other gasses and/or particulate components, depending upon the source, e.g., it may be a multi-component gas (i.e., a multi-component gaseous stream). In certain embodiments, the $CO_2$ containing gas is obtained from an industrial plant, e.g., where the $CO_2$ containing gas is a waste feed from an industrial plant. Industrial plants from which the $CO_2$ containing gas may be obtained, e.g., as a waste feed from the industrial plant, may vary. Industrial plants of interest include, but are not limited to, power plants and industrial product manufacturing plants, such as but not limited to chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components (which may be collectively referred to as non-$CO_2$ pollutants) such as nitrogen oxides (NOx), sulfur oxides (SOx), and one or more additional gases. Additional gases and other components may include CO, mercury and other heavy metals, and dust particles (e.g., from calcining and combustion processes). Additional non-$CO_2$ pollutant components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2000 ppm; or 200 ppm to 1000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2000 ppm; or 500 ppm to 1000 ppm; or 1000 ppm to 1,000,000 ppm; or 1000 ppm to 500,000 ppm; or 1000 ppm to 100,000 ppm; or 1000 ppm to 10,000; or 1000 ppm to 5,000 ppm; or 1000 ppm to 2000 ppm; or 2000 ppm to 1,000,000 ppm; or 2000 ppm to 500,000 ppm; or 2000 ppm to 100,000 ppm; or 2000 ppm to 10,000; or 2000 ppm to 5,000 ppm; or 2000 ppm to 3000 ppm; or 5000 ppm to 1,000,000 ppm; or 5000 ppm to 500,000 ppm; or 5000 ppm to 100,000 ppm; or 5000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm.

The waste streams, particularly various waste streams of combustion gas, may include one or more additional non-$CO_2$ components, for example only, water, NOx (mononitrogen oxides: NO and $NO_2$), SOx (monosulfur oxides: SO, $SO_2$ and $SO_3$), VOC (volatile organic compounds), heavy metals such as, but not limited to, mercury, and particulate matter (particles of solid or liquid suspended in a gas). Flue gas temperature may also vary. In some embodiments, the temperature of the flue gas comprising $CO_2$ is from 0° C. to 2000° C., or 0° C. to 1000° C., or 0. degree ° C. to 500° C., or 0° C. to 100° C., or 0° C. to 50° C., or 10° C. to 2000° C., or 10° C. to 1000° C., or 10° C. to 500° C., or 10° C. to 100° C., or 10° C. to 50° C., or 50° C. to 2000° C., or 50° C. to 1000° C., or 50° C. to 500° C., or 50° C. to 100° C., or 100° C. to 2000° C., or 100° C. to 1000° C., or 100° C. to 500° C., or 500° C. to 2000° C., or 500° C. to 1000° C., or 500° C. to 800° C., or such as from 60° C. to 700° C., and including 100° C. to 400° C.

In sequestering $CO_2$ from a $CO_2$-containing gas, a $CO_2$-containing gas may be contacted with an aqueous medium under conditions sufficient to remove $CO_2$ from the $CO_2$-containing gas and produce a bicarbonate component, which bicarbonate component may then be contacted with a cation source to produce a substantially pure $CO_2$ product gas and a carbonate $CO_2$ sequestering component, e.g., as described in greater detail below.

The aqueous medium may vary, ranging from fresh water to bicarbonate buffered aqueous media. Bicarbonate buffered aqueous media employed in embodiments of the invention include liquid media in which a bicarbonate buffer is present. As such, liquid aqueous media of interest include dissolved $CO_2$, water, carbonic acid ($H_2CO_3$), bicarbonate ions ($HCO_3^-$), protons ($H^+$) and carbonate ions ($CO_3^{2-}$). The constituents of the bicarbonate buffer in the aqueous media are governed by the equation:

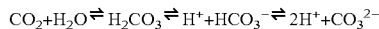
$$CO_2 + H_2O \rightleftharpoons H_2CO_3 \rightleftharpoons H^+ + HCO_3^- \rightleftharpoons 2H^+ + CO_3^{2-}$$

The pH of the bicarbonate buffered aqueous media may vary, ranging in some instances from 7 to 11, such as 8 to 11, e.g., 8 to 10, including 8 to 9. In some instances, the pH ranges from 8.2 to 8.7, such as from 8.4 to 8.55. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Of interest in some instances are waters that provide for excess alkalinity, which is defined as alkalinity that is provided by sources other than bicarbonate ion. In these instances, the amount of excess alkalinity may vary, so long as it is sufficient to provide 1.0 or slightly less, e.g., 0.9, equivalents of alkalinity. Waters of interest include those that provide excess alkalinity (meq/liter) of 30 or higher, such as 40 or higher, 50 or higher, 60 or higher, 70 or higher, 80 or higher, 90 or higher, 100 or higher, etc. Where such waters are employed, no other source of alkalinity, e.g., NaOH, is required.

In some instances, the aqueous medium that is contacted with the $CO_2$ containing gas is one which, in addition to the bicarbonate buffering system (e.g., as described above), further includes an amount of divalent cations. Inclusion of divalent cations in the aqueous medium can allow the concentration of bicarbonate ion in the bicarbonate rich product to be increased, thereby allowing a much larger amount of $CO_2$ to become sequestered as bicarbonate ion in the bicarbonate rich product. In such instances, bicarbonate ion concentrations that exceed 5,000 ppm or greater, such as 10,000 ppm or greater, including 15,000 ppm or greater may be achieved. For instance, calcium and magnesium occur in seawater at concentrations of 400 and 1200 ppm respectively. Through the formation of a bicarbonate rich product using seawater (or an analogous water as the aqueous medium), bicarbonate ion concentrations that exceed 10,000 ppm or greater may be achieved.

In such embodiments, the total amount of divalent cation source in the medium, which divalent cation source may be made up of a single divalent cation species (such as $Ca^{2+}$) or two or more distinct divalent cation species (e.g., $Ca^{2+}$, $Mg^{2+}$, etc.), may vary, and in some instances is 100 ppm or greater, such as 200 ppm or greater, including 300 ppm or greater, such as 500 ppm or greater, including 750 ppm or greater, such as 1,000 ppm or greater, e.g., 1,500 ppm or greater, including 2,000 ppm or greater. Divalent cations of interest that may be employed, either alone or in combination, as the divalent cation source include, but are not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$ and the like. Other cations of interest that may or may not be divalent include, but are not limited to: $Na^+$, $K^+$, $NH_4^+$, and $Li^+$, as well as cationic species of Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Naturally occurring aqueous media which include a cation source, divalent or otherwise, and therefore may be employed in such embodiments include, but are not limited to: aqueous media obtained from seas, oceans, estuaries, lagoons, brines, alkaline lakes, inland seas, etc.

In some instances, the aqueous medium is one that has been subjected to an alkali recovery process, such as a membrane mediated alkali recovery process. In such instances, prior to contact with the $CO_2$ containing gas, the aqueous medium is subjected to a process that results in an increase in the pH of the aqueous medium. Of interest are membrane mediated processes, such as forward osmosis mediated process. Alkali recovery processes of interest include, but are not limited to, those described in PCT Application Serial No: PCT/US2015/018361 published as WO 2015/134408; the disclosure of which is herein incorporated by reference.

Contact of the $CO_2$ containing gas and bicarbonate buffered aqueous medium is done under conditions sufficient to remove $CO_2$ from the $CO_2$ containing gas (i.e., the $CO_2$ containing gaseous stream), and increase the bicarbonate ion concentration of the buffered aqueous medium to produce a bicarbonate rich product. The bicarbonate rich product is, in some instances, a two-phase liquid that includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid.

LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution.

The bulk phase and LCP are characterized by having different $K_{eq}$, different viscosities, and different solubilities between phases. Bicarbonate, carbonate, and divalent ion constituents of the LCP droplets are those that, under appropriate conditions, may aggregate into a post-critical nucleus, leading to nucleation of a solid phase and continued growth. While the association of bicarbonate ions with divalent cations, e.g., $Ca^{2+}$, in the LCP droplets may vary, in some instances bidentate bicarbonate ion/divalent cation species may be present. For example, in LCPs of interest, $Ca^{2+}$/bicarbonate ion bidentate species may be present. While the diameter of the LCP droplets in the bulk phase of the LCP may vary, in some instances the droplets have a diameter ranging from 1 to 500 nm, such as 10 to 100 nm. In the LCP, the bicarbonate to carbonate ion ratio, (i.e., the $HCO_3^-$/$CO_3^{2-}$ ratio) may vary, and in some instances is 10 or greater to 1, such as 20 or greater to 1, including 25 or greater to 1, e.g., 50 or greater to 1. Additional aspects of LCPs of interest are found in Bewernitz et al., "A metastable liquid precursor phase of calcium carbonate and its interactions with polyaspartate," Faraday Discussions. 7 Jun. 2012. DOI: 10.1039/c2fd20080e (2012) 159: 291-312. The presence of LCPs may be determined using any convenient protocol, e.g., the protocols described in Faatz et al., Advanced Materials, 2004, 16, 996-1000; Wolf et al., Nanoscale, 2011, 3, 1158-1165; Rieger et al., Faraday Discussions, 2007, 136, 265-277; and Bewernitz et al., Faraday Discussions, 2012, 159, 291-312.

Where the bicarbonate rich product has two phases, e.g., as described above, the first phase may have a higher concentration of bicarbonate ion than a second phase, where the magnitude of the difference in bicarbonate ion concentration may vary, ranging in some instances from 0.1 to 4, such as 1 to 2. For example, in some embodiments, a bicarbonate rich product may include a first phase in which the bicarbonate ion concentration ranges from 1000 ppm to 5000 ppm, and a second phase where the bicarbonate ion concentration is higher, e.g., where the concentration ranges from 5000 ppm to 6000 ppm or greater, e.g., 7000 ppm or greater, 8000 ppm or greater, 9000 ppm or greater, 10,000 ppm or greater, 25,000 ppm or greater, 50,000 ppm or greater, 75,000 ppm or greater, 100,000 ppm, 500,000 or greater.

In addition to the above characteristics, a given bicarbonate rich product may include a number of additional markers which serve to identify the source of $CO_2$ from it has been produced. For example, a given bicarbonate component may include markers which identify the water from which it has been produced. Waters of interest include naturally occurring waters, e.g., waters obtained from seas, oceans, lakes, swamps, estuaries, lagoons, brines, alkaline lakes, inland seas, as well as man-made waters, e.g., brines produced by water desalination plants, and the like. In such instances, markers that may be present include amounts of one or more of the following elements: Ca, Mg, Be, Ba, Sr, Pb, Fe, Hg, Na, K, Li, Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Alternatively or in addition to the above markers, a given bicarbonate component may include markers which identify the particular $CO_2$-containing gas used to produce the bicarbonate component. Such markers may include, but are not limited to, one or more of: nitrogen, mononitrogen oxides, e.g., NO, $NO_2$, and $NO_3$, oxygen, sulfur, monosulfur oxides, e.g., SO, $SO_2$ and $SO_3$), volatile organic compounds, e.g., benzo(a)pyrene $C_2OH_{12}$, benzo(g,h,l)perylene $C_{22}H_{12}$, dibenzo(a,h)anthracene $C_{22}H_{14}$, etc. Particulate components that may be present in the $CO_2$ containing gas from which the bicarbonate component is produced and therefore which may be present in the bicarbonate component include, but are not limited to particles of solids or liquids suspended in the gas, e.g., heavy metals such as strontium, barium, mercury, thallium, etc. When present, such markers may vary in their amounts, ranging in some instances from 0.1 to 10,000, such as 1 to 5,000 ppm. Of interest in certain embodiments are agents (referred to herein as "bicarbonate promoters" or "BLCP promoters") that promote the production of high-bicarbonate-content bicarbonate additive (which may also be referred to herein as a bicarbonate admixture), e.g., by promoting the production and/or stabilization of BLCPs, e.g., facilitating the formation of a BLCP in a bicarbonate-containing solution while preventing precipitation of the solution's components to form solid carbonate-containing materials. A high-bicarbonate-content bicarbonate component is one that has a bicarbonate content of 0.1 wt. % or greater, such as 4 wt. % or greater, including 10 wt. % or greater, such as a bicarbonate component having a bicarbonate content ranging from 5 to 40 wt. %, such as 10 to 20 wt. %. The amount of bicarbonate promoter present in a given bicarbonate component may vary, where in some instances the amount ranges from 0.000001 wt. % to 40 wt. %, such as 0.0001 to 20 wt. % and including 0.001 to 10 wt. %. Such promoters are further described in U.S. patent application Ser. No. 14/112,495; the disclosure of which is herein incorporated by reference.

As indicated above, in sequestering $CO_2$ according to certain embodiments of the invention, the $CO_2$ containing gas is contacted with an aqueous medium under conditions sufficient to produce the bicarbonate-rich product. The $CO_2$ containing gas may be contacted with the aqueous medium using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, or packed column reactors, and the like, as may be convenient. The process may be a batch or continuous process.

Contact occurs under conditions such that a substantial portion of the $CO_2$ present in the $CO_2$ containing gas goes into solution to produce bicarbonate ions. In some instances, 5% or more, such as 10% or more, including 20% or more of all the bicarbonate ions in the initial expanded liquid phase solution (mother liquor) become sequestered in LCPs. Where desired, the $CO_2$ containing gas is contacted with the bicarbonate buffered aqueous medium in the presence of a catalyst (i.e., an absorption catalyst) that mediates the conversion of $CO_2$ to bicarbonate. Catalysts of interest are further described in U.S. patent application Ser. No. 14/112, 495; the disclosure of which is herein incorporated by reference.

Where desired, following production of the LCP containing liquid, the resultant LCP containing liquid may be manipulated to increase the amount or concentration of LCP droplets in the liquid. As such, following production of the bicarbonate containing liquid, the bicarbonate containing liquid may be further manipulated to increase the concentration of bicarbonate species and produce a concentrated bicarbonate liquid. In some instances, the bicarbonate containing liquid is manipulated in a manner sufficient to increase the pH. In such instances, the pH may be increased by an amount ranging from 0.1 to 6 pH units, such as 1 to 3 pH units. The pH of the concentrated bicarbonate liquid of such as step may vary, ranging in some instances from 5.0 to 13.0, such as 6.5 to 8.5. The concentration of bicarbonate species in the concentrated bicarbonate liquid may vary, ranging in some instances from 1 to 1000 mM, such as 20 to 200 mM and including 50 to 100 mM. In some instances, the concentrated bicarbonate liquid may further include an amount of carbonate species. While the amount of carbonate species may vary, in some instances the carbonate species is present in an amount ranging from 0.01 to 800 mM, such as 10 to 100 mM.

The pH of the bicarbonate liquid may be increased using any convenient protocol. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide (Ca(OH)$_2$), or magnesium hydroxide (Mg(OH)$_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide (NaNH$_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Another type of further manipulation following production that may be employed is a dewatering of the initial barcarbonate containing liquid to produce a concentrated bicarbonate containing liquid, e.g., a concentrated LCP liquid. Dewatering may be accomplished using any convenient protocol, such as via contacting the LCP composition with a suitable membrane, such as an ultrafiltration membrane, to remove water and certain species, e.g., NaCl, HCl, H$_2$CO$_3$ but retain LCP droplets, e.g., as described in greater detail in U.S. application Ser. No. 14/112,495; the disclosure of which is herein incorporated by reference Following preparation of the bicarbonate rich product (as well as any storage thereof, as desired), the bicarbonate rich product or component thereof (e.g., LCP) is manipulated to produce a CO$_2$ containing product gas and a solid phase carbonate composition. In certain instances of such embodiments, the bicarbonate rich product or component thereof (e.g., LCP) is combined with a cation source (e.g., a source of one or more alkaline earth metal cations) under conditions sufficient to produce a solid carbonate composition. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium and magnesium cations, may be employed. When cations are added to the bicarbonate rich product or component thereof (e.g., LCP), precipitation of carbonate solids, such as amorphous calcium carbonate when the divalent cations include Ca$^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the bicarbonate rich product or component thereof (e.g., LCP). The cation source employed in such solid carbonate production steps may be the same as or different from the aqueous media employed in the bicarbonate rich product production step, e.g., as described above. For example, the aqueous medium employed to produce a bicarbonate rich product may be native seawater with a calcium cation concentration of approximately 400 ppm. A more concentrated cation solution, such as the brine concentrate from a seawater desalination plant, with over twice the native seawater concentration of calcium cation, may then be employed for the second precipitation step.

During the production of solid carbonate compositions from the bicarbonate rich product or component thereof (e.g., LCP), one mol of CO$_2$ may be produced for every 2 mols of bicarbonate ion from the bicarbonate rich product or component thereof (e.g., LCP). For example, where solid carbonate compositions are produced by adding calcium cation to the bicarbonate rich product or component thereof (e.g., LCP), the production of solid carbonate compositions, e.g., the form of amorphous calcium carbonate minerals, may proceed according to the following reaction:

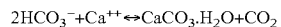

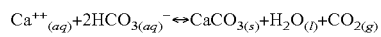

While the above reaction shows the production of 1 mol of CO$_2$, 2 moles of CO$_2$ from the CO$_2$ containing gas were initially converted to bicarbonate. As such, the overall process sequesters a net 1 mol of CO$_2$ in a carbonate compound and produces 1 mol of substantially pure CO2 product gas, which may be sequestered by injection into a subsurface geological location, as described in greater detail below. Therefore, the process is an effective CO$_2$ sequestration process.

In producing the CO$_2$ sequestering material from a CO$_2$-containing gas, a CO$_2$-containing gas may be contacted with an aqueous medium under conditions sufficient to remove CO$_2$ from the CO$_2$-containing gas and produce the bicarbonate component, e.g., as described above. While any convenient protocol may be employed, protocols of interest include, but are not limited to, those described in U.S. patent application Ser. No. 14/112,495; the disclosure of which is herein incorporated by reference.

As reviewed above, contact of the bicarbonate rich product with the cation source results in production of a substantially pure CO$_2$ product gas. The phrase "substantially pure" means that the product gas is pure CO$_2$ or is a CO$_2$ containing gas that has a limited amount of other, non-CO$_2$ components.

Following production of the CO$_2$ product gas, aspects of the invention include injecting the product CO$_2$ gas into a subsurface geological location to sequester CO$_2$. By injecting is meant introducing or placing the CO$_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

As mentioned above, in addition to the $CO_2$ product gas, the methods result in the production of a carbonate composition. The product carbonate compositions may vary greatly. The precipitated product may include one or more different carbonate compounds, such as two or more different carbonate compounds, e.g., three or more different carbonate compounds, five or more different carbonate compounds, etc., including non-distinct, amorphous carbonate compounds. Carbonate compounds of precipitated products of the invention may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n.H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3.6H_2O$), and amorphous calcium carbonate ($CaCO_3$). Magnesium carbonate minerals of interest include, but are not limited to magnesite ($MgCO_3$), barringtonite ($MgCO_3.2H_2O$), nesquehonite ($MgCO_3.3H_2O$), lanfordite ($MgCO_3.5H_2O$), hydromagnisite, and amorphous magnesium calcium carbonate ($MgCO_3$). Calcium magnesium carbonate minerals of interest include, but are not limited to dolomite ($CaMg)(CO_3)_2$), huntite ($Mg_3Ca(CO_3)_4$) and sergeevite ($Ca_2Mg_{11}(CO_3)_{13}.H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1. In some instances, the precipitated product may include hydroxides, such as divalent metal ion hydroxides, e.g., calcium and/or magnesium hydroxides.

In some embodiments, one or more additional components or co-products (i.e., products produced from other starting non-$CO_2$ materials (e.g., non-$CO_2$ pollutant material, e.g., SOx, NOx, etc.) under the same conditions employed to convert $CO_2$ into carbonates and/or bicarbonates) are precipitated or trapped in precipitation material formed by contacting the waste gas stream comprising these additional components with an aqueous solution comprising divalent cations (e.g., alkaline earth metal ions such as, but not limited to, $Ca^{2+}$ and $Mg^{2+}$. In addition, $CaCO_3$, $MgCO_3$, and related compounds may be formed without additional release of $CO_2$. Sulfates, sulfites, and the like of calcium and/or magnesium may be precipitated or trapped in precipitation material (further comprising, for example, calcium and/or magnesium carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In such embodiments of the invention, catalysts (e.g., carbonic anhydrase) may be employed where desired in the gas-liquid contacting step to catalytically hydrate $CO_2$ in the presence of SOx, and optionally, NOx and other criteria pollutants. In instances where the aqueous solution of divalent cations contains high levels of sulfur compounds (e.g., sulfate), the aqueous solution may be enriched with calcium and magnesium so that calcium and magnesium are available to form carbonate and/or bicarbonate compounds after, or in addition to, formation of $CaSO_4$, $MgSO_4$, and related compounds.

In some embodiments, a desulfurization step may be staged to coincide with precipitation of carbonate- and/or bicarbonate-containing precipitation material, or the desulfurization step may be staged to occur before precipitation. In such embodiments of the invention, catalysts (e.g., carbonic anhydrase) may be used in gas-liquid contacting step to catalytically hydrate $CO_2$ in the absence of SOx, or in the presence of very low levels of SOx. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, bicarbonates, sulfates, etc.) is collected. In step with these embodiments, other components, such as heavy metals (e.g., mercury, mercury salts, mercury-containing compounds), may be trapped in the carbonate- and/or bicarbonate-containing precipitation material or may precipitate separately.

Precipitation of solid carbonate compositions from a dissolved inorganic carbon (DIC) composition (e.g., an LCP composition as employed in a bicarbonate-mediated sequestration protocol), such as described above, results in the production of a composition that includes both precipitated solid carbonate compositions, as well as the remaining liquid from which the precipitated product was produced (i.e., the mother liquor). This composition may be present as a slurry of the precipitate and mother liquor.

The carbonate precipitation conditions may vary, as desired. For example, the carbonate precipitation conditions may be transient amorphous calcium carbonate precipitation conditions. In some instances, the carbonate precipitation conditions produce a first precipitated carbonate composition and second precipitated carbonate composition. In such instances, the first precipitated carbonate composition may be an amorphous calcium carbonate (ACC) and the second precipitated carbonate composition is vaterite precursor ACC. In such embodiments, the method further comprises separating the first and second precipitated carbonate compositions from each other. Conveniently, the first and second precipitated carbonate compositions are separated from each other with a membrane. In some instances, the method further includes combining the separated first and second precipitated carbonate compositions.

This product slurry may be disposed of in some manner following its production. The phrase "disposed of" means that the slurry or a portion thereof, e.g., the solid carbonate composition portion thereof, is either placed at a storage site or employed for a further use in another product, i.e., a manufactured or man-made item, where it is "stored" in that other product at least for the expected lifetime of that other product.

In some instances, this disposal step includes forwarding the slurry composition described above to a long-term storage site. The storage site could be an above ground site, a below ground site or an underwater site. In these embodiments, following placement of the slurry at the storage site, the mother liquor component of the slurry may naturally separate from the precipitate, e.g., via evaporation, dispersal, etc.

Where desired, the resultant precipitated product (i.e., solid carbonate composition) may be separated from the resultant mother liquor. Separation of the solid carbonate composition can be achieved using any convenient approach. For example, separation may be achieved by drying the solid carbonate composition to produce a dried solid carbonate composition. Drying protocols of interest include filtering the precipitate from the mother liquor to produce a filtrate and then air-drying the filtrate. Where the filtrate is air dried, air-drying may be at a temperature ranging from −70 to 120° C., as desired. In some instances, drying may include placing the slurry at a drying site, such as a tailings pond, and allowing the liquid component of the precipitate to evaporate and leave behind the desired dried product. Also of interest are freeze-drying (i.e., lyophilization) protocols, where the solid carbonate composition is frozen, the surrounding pressure is reduced and enough heat is added to allow the frozen water in the material to sublime directly from the frozen precipitate phase to gas. Yet another drying protocol of interest is spray drying, where the liquid containing the precipitate is dried by feeding it through a hot gas, e.g., where the liquid feed is pumped through an atomizer into a main drying chamber and a hot gas is passed as a co-current or countercurrent to the atomizer direction.

Where the precipitated product is separated from the mother liquor, the resultant precipitate may be disposed of in a variety of different ways, as further elaborated below. For example, the precipitate may be employed as a component of a building material, as reviewed in greater detail below. Alternatively, the precipitate may be placed at a long-term storage site (sometimes referred to in the art as a carbon bank), where the site may be above ground site, a below ground site or an underwater, e.g., deepwater, site.

In certain embodiments, the product carbonate composition is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as a sand, a gravel, as an aggregate, etc. In certain embodiments, one or more components may be added to the precipitate, e.g., where the precipitate is to be employed as a cement, e.g., one or more additives, sands, aggregates, supplemental cementitious materials, etc. to produce final product, e.g., concrete or mortar.

In certain embodiments, the carbonate compound is utilized to produce aggregates, e.g., as described in U.S. Pat. No. 7,914,685, the disclosure of which is herein incorporated by reference. In certain embodiments, the carbonate compound precipitate is employed as a component of hydraulic cement. The term "hydraulic cement" is employed in its conventional sense to refer to a composition that sets and hardens after combining with water. Setting and hardening of the product produced by combination of the cements of the invention with an aqueous fluid result from the production of hydrates that are formed from the cement upon reaction with water, where the hydrates are essentially insoluble in water. Such carbonate compound component hydraulic cements, methods for their manufacture and use include, but are not limited to, those described in U.S. Pat. No. 7,735,274; the disclosure of which is herein incorporated by reference.

Also of interest are dissolution precipitation cements like orthopedic calcium phosphate cements that undergo dissolution into solution and precipitate out an alternate material. Dissolution precipitation cements are that are not hydrating however will employ solution as an ion sink which mediates the recrystallization of the lower energy state material which is likened to concrete and can contain volume fillers such as aggregates and finer aggregates.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component.

Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

In addition to (or instead of) processing $CO_2$ (e.g., by producing pure $CO_2$ and then sequestering it as described above), embodiments of the invention also encompass processing other products resulting from combustion of carbon-based fuels. For example, at least a portion of one or more of NOx, SOx, VOC, mercury and mercury-containing compounds, or particulates that may be present in the $CO_2$-containing gas may be fixed (i.e., precipitated, trapped, etc.) in precipitation material. In such embodiments, the methods may include using and/or disposing of such products, e.g., in a manner sufficient to sequester such products and the pollutants thereof, e.g., NOx, SOx, VOC, mercury and mercury-containing compounds, or particulates, in a manner analogous to that described above for $CO_2$. Accordingly, embodiments of the invention include methods of depleting an initial gas of one or more of such pollutants, and then sequestering such pollutants.

As such, embodiments of the invention include methods of removing non-CO2 pollutants, e.g., NOx, SOx, VOC, mercury and mercury-containing compounds, or particulates, from a gas containing such pollutants. In other words, methods of separating non-$CO_2$ pollutants from a gas containing such pollutants are provided, where an input gas containing the target non-$CO_2$ pollutant(s) is processed to produce an output gas that has less of the target non-$CO_2$ pollutant(s) than the input gas. The output gas of the methods described herein may be referred to as "non-$CO_2$ pollutant depleted gas." The amount of non-$CO_2$ pollutant(s) in the treated gas is less than the amount of non-$CO_2$ pollutant(s) that is present in the input gas, where in some instances the amount of non-$CO_2$ pollutant(s) in the depleted gas is 95% or less, e.g., 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 5% or less, than the amount of target pollutant(s) that is present in the input containing gas.

Systems

Aspects of the invention further include systems, e.g., small scale devices, processing plants or factories, for sequestering $CO_2$, e.g., by practicing methods as described above. Systems of the invention may have any configuration that enables practice of the particular sequestration method of interest. In some embodiments, systems of the invention include: a source of the $CO_2$ containing gas; a source of an aqueous medium; a reactor configured to contact the $CO_2$ containing gas with the aqueous medium under conditions sufficient to produce a bicarbonate rich product, as well as a solid carbonate composition and a product $CO_2$ gas from the bicarbonate rich product; and an injector configured to inject the product $CO_2$ gas in a subsurface geological location.

Any convenient bicarbonate buffered aqueous medium source may be included in the system. In certain embodiments, the source includes a structure having an input for aqueous medium, such as a pipe or conduit from an ocean, etc. Where the aqueous medium is seawater, the source may be an input that is in fluid communication with the sea water, e.g., such as where the input is a pipe line or feed from ocean water to a land based system or an inlet port in the hull of ship, e.g., where the system is part of a ship, e.g., in an ocean based system.

The $CO_2$ containing gas source may vary. Examples of $CO_2$ containing gas sources include, but are not limited to, pipes, ducts, or conduits which direct the $CO_2$ containing gas to a portion of the system, e.g., to a reactor configured to produce a bicarbonate rich product, e.g., that includes LCPs. The aqueous medium source and the $CO_2$ containing gas source are connected to a reactor configured to contact the $CO_2$ containing gas with the bicarbonate buffered aqueous medium under conditions sufficient to produce a bicarbonate rich product, such as described above. The reactor may include any of a number of components, such as temperature regulators (e.g., configured to heat the water to a desired temperature), chemical additive components, e.g., for introducing agents that enhance bicarbonate production, mechanical agitation and physical stirring mechanisms. The reactor may include a catalyst that mediates the conversion of $CO_2$ to bicarbonate, such as described above. The reactor may also include components that allow for the monitoring of one or more parameters such as internal reactor pressure, pH, metal-ion concentration, and $pCO_2$.

The reactor further includes an output conveyance for the bicarbonate rich product. In some embodiments, the output conveyance may be configured to transport the bicarbonate rich component to a storage site, such as an injection into subsurface brine reservoirs, a tailings pond for disposal or in a naturally occurring body of water, e.g., ocean, sea, lake, or river. In yet other embodiments, the output may transfer the bicarbonate rich product to a packaging station, e.g., for putting into containers and packaging with a hydraulic cement. Alternatively, the output may convey the bicarbonate rich product to second reactor, which may be configured to produce solid carbonate compositions, i.e., precipitates, from the bicarbonate rich product.

In some instances, the systems include a second reactor configured to further process the bicarbonate rich product, e.g., to dry the product, to combine the product with one or more additional components, e.g., a cement additive, to produce solid carbonate compositions from a bicarbonate rich product, etc. For embodiments where the reactor is configured to produce a carbonate product, such reactors include an input for the bicarbonate rich product, as well as an input for a source of cations (such as described above) which introduces the cations into the bicarbonate rich product in a manner sufficient to cause precipitation of solid carbonate compounds. Where desired, this reactor may be operably coupled to a separator configured to separate a precipitated carbonate mineral composition from a mother liquor, which are produced from the bicarbonate rich product in the reactor. In certain embodiments, the separator may achieve separation of a precipitated carbonate mineral composition from a mother liquor by a mechanical approach, e.g., where bulk excess water is drained from the precipitate by gravity or with the addition of a vacuum, mechanical pressing, filtering the precipitate from the mother liquor to produce a filtrate, centrifugation or by gravitational sedimentation of the precipitate and drainage of the mother liquor. The system may also include a washing station where bulk dewatered precipitate from the separator is washed, e.g., to remove salts and other solutes from the precipitate, prior to drying at the drying station. In some instances, the system further includes a drying station for drying the precipitated carbonate mineral composition produced by the carbonate mineral precipitation station. Depending on the particular drying protocol of the system, the drying station may include a filtration element, freeze drying structure, spray drying structure, etc. as described more fully above. The system may include a conveyer, e.g., duct, from the industrial plant that is connected to the dryer so that a gaseous waste stream (i.e., industrial plant flue gas) may be contacted directly with the wet precipitate in the drying stage. The resultant dried precipitate may undergo further processing, e.g., grinding, milling, in refining station, in order to obtain desired physical properties. One or more components may be added to the precipitate where the precipitate is used as a building material.

The system may further outlet conveyers, e.g., conveyer belt, slurry pump, that allow for the removal of precipitate from one or more of the following: the reactor, drying station, washing station or from the refining station. The product of the precipitation reaction may be disposed of in a number of different ways. The precipitate may be transported to a long term storage site in empty conveyance vehicles, e.g., barges, train cars, trucks, etc., that may include both above ground and underground storage facilities. In other embodiments, the precipitate may be disposed of in an underwater location. Any convenient protocol for transporting the composition to the site of disposal may be employed. In certain embodiments, a pipeline or analogous slurry conveyance structure may be employed, where these approaches may include active pumping, gravitational mediated flow, etc.

In certain embodiments, the system will further include a station for preparing a building material, such as cement, from the precipitate. This station can be configured to produce a variety of cements, aggregates, or cementitious materials from the precipitate, e.g., as described in U.S. Pat. No. 7,735,274; the disclosure of which application is herein incorporated by reference.

In addition, the system includes an output for the substantially pure product $CO_2$ gas. The output may be operatively coupled to an injector configured to inject the product $CO_2$ into a subsurface geological location, e.g., as described above. Where desired, the system may include a compressor and/or temperature modulator for the $CO_2$ product gas, where such component, when present, are operatively positioned between the output and the injector. As the injector and output are operatively coupled, they may be directly connected to each other or connected via a conveyor, such as a pipeline.

Systems of the invention may be configured as continuous or batch systems, as desired. Additional details regarding reactors of interest may be found in U.S. patent application Ser. No. 14/112,495; the disclosure of which is herein incorporated by reference.

The following examples are offered by way of illustration and not by way of limitation.

EXPERIMENTAL

I. Materials and Methods

A. NTA Image Collection

Data was collected on a NS-500 nanoparticle tracking analyzer (Malvern) due to its capabilities to analyze dilute species in solution in a way that dynamic light scattering cannot (V. Filipe, A. Hawe, W. Jiskoot, Critical Evaluation of Nanoparticle Tracking Analysis (NTA) by NanoSight for the Measurement of Nanoparticles and Protein Aggregates. Pharmaceutical Research 27, 796 (2010)). Raw data consisted of 60 second recordings of the scattering projections of various solution sat a camera length setting of 16. Still shots used in figures are representative still shots of this recording. The recording was processed to generate the histogram of particle size vs. particle count with a bin size of 20 nm. The settings used to process the raw data were a detection threshold of 6, auto-blur, auto-minimum expected particle size, and a solution viscosity equal to that of water at 25° C. (0.89 cP).

B. Sample Preparations for NTA Image Collection

Figure 6:
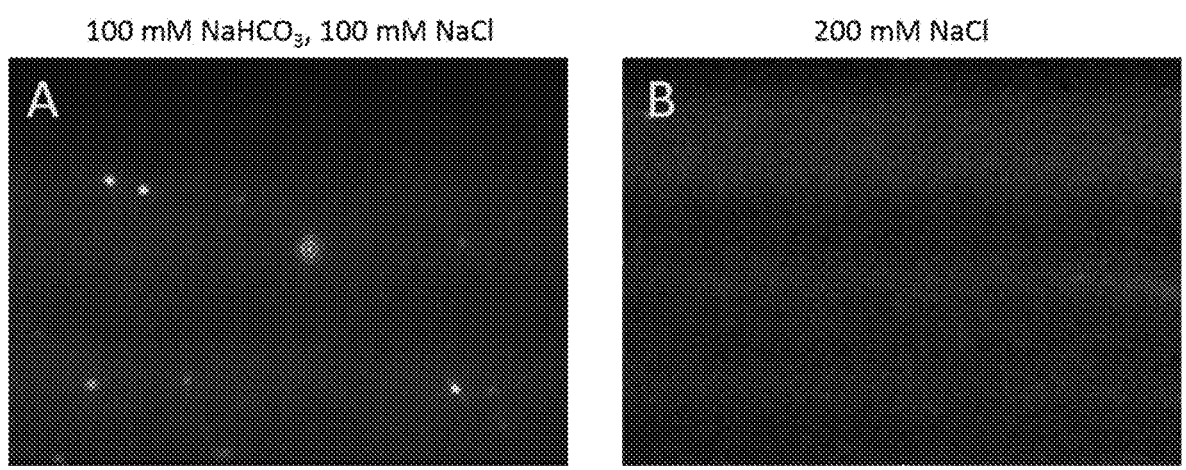
FIG. 6. Bicarbonate ions form bicarbonate-rich liquid condensed phase. Still-shots of the scattering projections obtained by nanoparticle tracking analysis (NTA) strongly suggest that the bicarbonate ion participates in a condensation, as reported for bicarbonate-rich LCP. A) A solution containing 100 mM NaHCO3 and 100 mM NaCl contain many scattering events presumably due to the formation of bicarbonate-rich LCP. B) A solution containing 200 mM NaCl does not display scattering events at the same conditions. This is evidence that the bicarbonate ion participates in a condensation to form bicarbonate-rich LCP even in relatively simple, undersaturated solutions. The species seen in A are a distribution of sizes centered around 50-60 nm in diameter as shown in FIG. 1C of the main report.

The simulated Cretaceous seawater at a $pCO_2$ simulating the cretaceous era seen in FIG. 1, panel A was created by mixing 23.9 g NaCl (Sigma-Aldrich, S9888), 4.01 g $Na_2SO_4$, anhydrous (Acros Organics, S421), 0.68 g KCl (Sigma Aldrich, P9541), 0.2 g $NaHCO_3$, (Aqua Solutions, 144-55-8), 3 g $MgCl_2$ hexahydrate (Research Products International Corp., M24000), and 3.5 g $CaCl_2$ dihydrate (Aqua Solutions, C0630) into 1 liter of nanopure water to create a simulated Cretaceous era seawater (1:1 $[Mg^{2+}]/[Ca^{2+}]$ ratio). The solution was titrated to pH 8.1 with NaOH (aq) (Alfa Aesar, A 18395) and then gassed with $CO_2$ to pH 7.7 to simulate the higher $P_{CO2}$ of the Cretaceous era. The value, pH 7.7 was chosen by using Geochemist's Workbench™ to estimate the pH of the saltwater solution in equilibrium with a $P_{CO2}$ of 7 times that of the modern era prior to the industrial revolution (210 ppm). Modern seawater (seen in FIG. 1, panel B) was obtained from Monterey Bay, Calif. and was sand-filtered at the Monterey Bay Aquarium Institute at Moss Landing, Calif. The simple bicarbonate solution seen in FIG. 1, panel C consisted of 100 mM $NaHCO_3$ and 100 mM NaCl. The control with which it was compared in FIG. 6 consisted of a 200 mM NaCl solution. Adult Fetal Bovine serum was analyzed by using Adult Bovine Serum (Sigma B9433, batch 12B519) and diluting 1:100 in nanopure water prior to filtering with a 200 nm diameter pore size syringe filter (Whatman Cat. No. 6809-1122).

C. Sample Preparation NMR Measurements

A solution containing 100 mM $NaHCO_3$ and 100 mM NaCl was created using 100% $^{13}C$ substituted $NaHCO_3$ (Cambridge Isotopes, 372382). No chemical shift standard was added to the solution to ensure electrolyte behavior is naturally occurring. All NMR data was obtained using a Varian Inova 500 magnet operating at 126 MHz using a 5 mm broadband probe. All experiments were conducted at 298 Kelvin. Deuterium oxide (Aldrich, 151882) was used to obtain a lock at a volume fraction of 2.5% of the total sample. Data was processed using NUTS™ and Microsoft Excel software when deconvolution of overlapping spectral peaks was required. 90° pulses were used with acquisition times of 6.35 seconds. The $T_2$ relaxation measurements were conducted using a Carr-Purcell-Meibloom-Gill (CPMG) sequence with increasing tau ($\tau$) times of 0.025, 0.05, 0.1, 0.2, 0.4, 0.8, 1.6, 3.2, 6.4 seconds.

D. Refractive Index Measurement

Species in the size range of the bicarbonate-rich LCP are generally in the Rayleigh scattering regime, where a close approximation of the efficiency of light scattering is given by equation (S1) below:

$$I \propto \sigma_s = \frac{2\pi^5}{3} \frac{d^6}{\lambda^4} \left(\frac{n^2-1}{n^2+2}\right)^2 \quad (S1)$$

Where:

I is the measured intensity of the scattering event $\sigma_s$ is the scattering cross section d is the species diameter $\lambda$ is the wavelength of incident light, here $\lambda$=402 nm n is the ratio of the scattering species refractive index to the solvent refractive index Equation (S1) relates the measured intensity of a scattering event (I) to the diameter of the scattering center species (d), the wavelength of incident light ($\lambda$) and the refractive indices (RI) of the scattering species and solvent. The NTA technique measures/directly and d by means of Brownian motion. If the RI of the solvent is known, a standard with a known RI can be used to calibrate the technique to account for software and equipment measurements of the relative intensity. Equation (S1) can then be used to calculate the RI for the scattering species (C. Gardiner, Y. J. Ferreira, R. A. Dragovic, C. W. G. Redman, I. L. Sargent, Extracellular vesicle sizing and enumeration by nanoparticle tracking analysis. Journal of Extracellular Vesicles 2, 19671 (2013); E. van der Pol et al., in International Society for Extracellular Vesicles 2014. (Rotterdam, Netherlands, 2014)).

Figure 7:
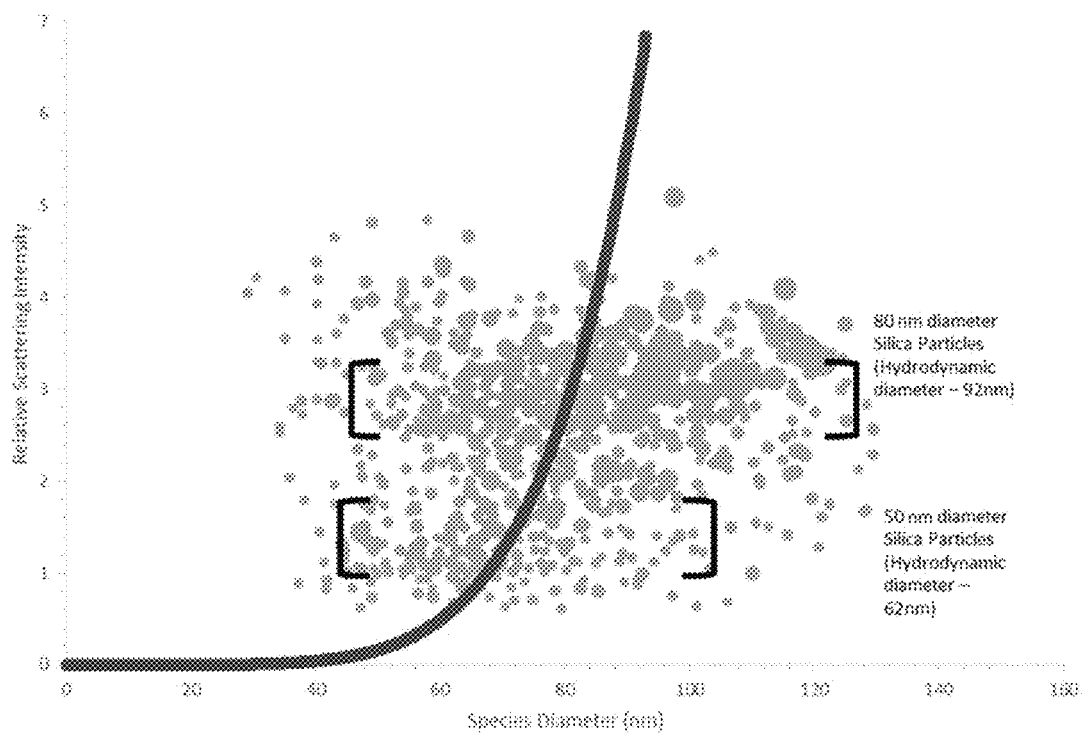
FIG. 7. The standardization of nanoparticle tracking analysis with silica particles for refractive index measurements. Scattering intensity vs. diameter of silica nanoparticles in water obtained from the NS500 nanoparticle tracking analyzer. To establish a standard curve and calibrate the NS500 NTA for refractive indices measurements, silica (SiO$_2$) nanoparticles (nanoComposix) of 50, and 80 nm (hydrated diameters of 62, and 92 nm, respectively) were used as the standard reference material (RI=1.51). A curve was fitted using the Raleigh approximation (equation S1) to fit the intensity of the scattering events with the measured size of the particles. The area of the data points (blue circles) represent the relative statistical certainty of the measurement.

To determine the RI of bicarbonate-rich LCP, silica ($SiO_2$) nanoparticles of 50, 80, 100 nm (hydrated diameters of 62, 92, 116 nm, respectively) were used as the standard reference material (RI=1.51). Equal masses of the different sized $SiO_2$ nanoparticles were placed into a solution of 100 mM $Na_2CO_3$ to the concentration of approximately $10^8$ particles/mL. The standard solution was then titrated with 1 N HCl, to pH 9.0, and analyzed for light scattering events using NTA. FIG. 7 displays the standard curve. This standard curve was applied to the data shown in FIG. 2C to demonstrate the reliability of the technique and to verify and validate the technique.

E. Pitzer Modeling

We carried out thermodynamic calculations of ion activities in carbonate solutions using Geochemist's Workbench software (GWB). The plot in FIG. 11 was obtained by subtracting the ion activity predicted by Pizer's Equations from the ion activity predicted by Debye-Hückel (D-H) theory. D-H theory accurately predicts ion activities up to about 10 mMolal concentration. Our assumption is that non-ideality at higher concentrations may be in part due to formation of LCP which removes some ions from bulk solution and thus lowers their activities. The sum of the deviations from D-H activities shown in FIG. 11 are simply the sum of the deviations for all ions and approximate the percent of ions present as LCP (assuming it is responsible for the lowered ion activities). We then compare trends in ion activities vs. pH for our calculated percent of ions present in LCP with observations of the volume of LCP based on light scattering measurements of real carbonate solutions.

F. Concentration of Bicarbonate-Rich LCP by Membrane Processes

Twenty gallons of solution of LCP droplets was concentrated with a DK (GE Osmonics) NF membrane and contained dissolved ions of sodium ($Na^+$), potassium ($K^+$), chloride ($Cl^-$) and bicarbonate ($HCO_3^-$); conductivity=10.8 mS. The NF system houses two custom made 1.8×12 inch elements, purchased from Membrane Development Specialists (Solana Beach, Calif.), and is operated by a positive displacement pump capable of moving roughly 2 gal water per minute. The NF system was operated at the flow rate specified by the membrane manufacturer. The feed solution was concentrated by continuously recirculating the concentrate back into the feed and removing permeate in incremental volumes. Potassium chloride (Sigma Aldrich) and sodium bicarbonate (Aqua Solutions, Sigma Aldrich, Church & Dwight Co. Inc.) were purchased commercially and were used without further purification.

Rejection of $NaHCO_3$ by various membrane types—reverse osmosis (RO), X20 (TriSep); nanofiltration (NF), DK (GE Osmonics); ultrafiltration (UF), MPF-36 (Koch Membrane Systems)—were investigated with a custom made flat-plate casing that houses 4-inch diameter sample elements, purchased from Membrane Development Specialists (Solana Beach, Calif.). The flat-plate system uses a positive displacement pump to move roughly 2 gal water per minute. Here, back-pressure on the system is adjusted so that permeate flow rate—in gallons of permeate per square foot of membrane per day (GFD)—meet the manufacturers specification. The Ion Rejection was calculated by dividing the conductivity of the permeate by the conductivity of the feed solution. Sodium bicarbonate (Aqua Solutions, Sigma Aldrich, Church & Dwight Co. Inc.) was purchased commercially and was used without further purification.

G. Preparation of Mortar Specimens

The mortar cube specimens were mixed according to ASTM C109/C109M (ASTM Standard C109/C109M, Standard Test Method for Compressive Strength of Hydraulic Cement Mortars (Using 2-in. or [50-mm] Cube Specimens). (ASTM International, West Conshohocken, Pa., 2013)) and used variations of the following components: Ottowa silica sand (ELE International), 16-200 mesh glass grade limestone sand (Blue Mountain Mineral, Colombia, Calif.), Basalite Type II-V cement, 15% interground (IG) cement, water, and liquid condensed phase (LCP) liquid. The 15% interground cement was prepared by blending 325 µm-sized natural limestone (Blue Mountain Minerals, Columbia, Calif.) with the Basalite cement and was then milled for 16 hours (PTA-02 Ball Mill with 10 L Jar). Mortar components were blended in a Hobart Mixer (Hobart Inc., Troy Ohio) according to ASTM C305 (ASTM Standard C305, Standard Practice for Mechanical Mixing of Hydraulic Cement Pastes and Mortars of Plastic Consistency. (ASTM International, West Conshohocken, Pa., 2013)). Mortar was transferred to 50 mm×50 mm cubic brass molds, specified by ASTM C109/C109M. Samples set in 100% relative humidity (RH), 73° F., were demolded at 1 day and further stored at 100% RH, 73° F., until mechanically loaded. Samples were mechanically loaded at 200 lb/s on an ELE load frame (Accu-Tek Touch 250 Series) in accordance with ASTM C109/C109M.

H. FTIR Analyses and Sample Preparation

FTIR spectra were recorded using a Nicolet IS-10 by Thermo-Fisher with a HeNe laser and a fast recovery deuterated triglycerine sulfate (DTGS) detector. Scans were collected on a Germanium ATR crystal at resolution of 16 and at optical velocity of 0.4747. FTIR samples were prepared by adding 0.25 M $CaCl_2$ (Sigma, Lot #BCBL2738 & Deionized Water) to 0.5M $NaHCO_3$ (Aqua Solutions, Lot #319302 & Deionized Water) (FIG. 8). 20 µl was pipetted onto the ATR crystal and the reaction was recorded in a time resolved fashion using a Macro applied to Omnic 9.2 software. The spectra were recorded at 0, 10, 20, and 1800 seconds.

I. Dissolved Inorganic Carbon (DIC) Analysis

The dissolved inorganic carbon (DIC) content of solution and solid carbonate samples were determined by acidometric titration and coulometric detection using a CM150 carbon analysis system (UIC, Inc.). The samples were typically titrated with 2N $H_2PO_4$ (Sigma Aldrich). To detect $CO_2$ evolved in reactions of $CaCl_2$ (Sigma Aldrich) with $NaHCO_3$ (Aqua Solutions), however, the samples were not titrated with $H_2PO_4$, but rather, a solution of $CaCl_2$ was titrated with a solution of $NaHCO_3$ because titration with $H_2PO_4$ would result in liberation of $CO_2$ from $CaCO_3$. This allowed $CO_2$ to be quantified by coulometric detection; any solid formed in the reaction was then isolated, dried and analyzed by FTIR to confirm its composition as $CaCO_3$. All analyses using the CM150 system were completed at 40° C.

J. Time-Resolved pH Measurement

Figure 8:
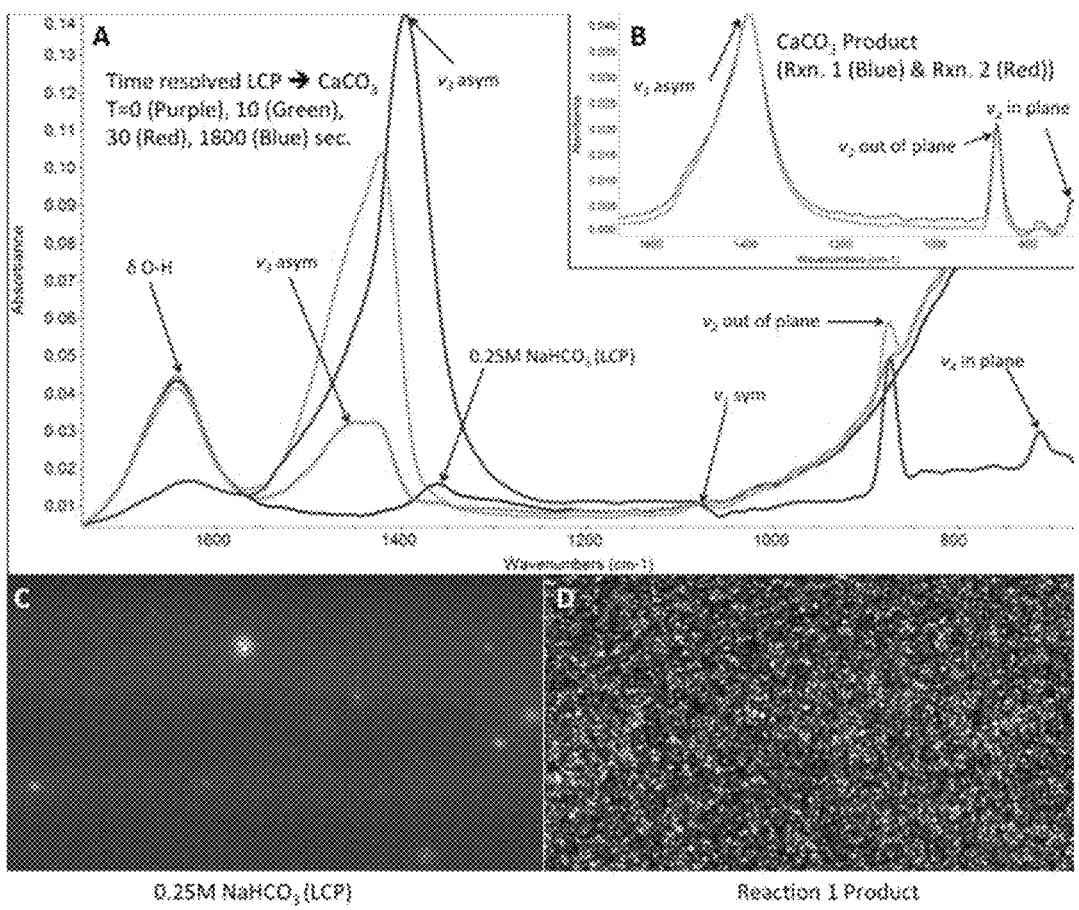
FIG. 8. Two pathways to calcium carbonate formation; a high pH pathway and a low pH pathway. 0.25 M CaCl$_2$ was added to equal volumes of either 0.5 M NaHCO$_3$ or 0.5 M Na$_2$CO$_3$ in a dump reaction manner and were analyzed immediately post mixing. The results suggest that there are two distinct pathways toward calcium carbonate formation; a familiar one designated in the main text as reaction 2 (CaCl$_2$ (aq) and Na$_2$CO$_3$ (aq) at high pH, carbonate pathway) and another pathway designated in the main text as reaction 1 (CaCl$_2$ (aq) into NaHCO$_3$ (aq) at neutral pH, bicarbonate pathway). (A) A Time Resolved Fourier Transform Infrared Spectra (FTIR) of a reaction 1 dump reaction at times of 0 seconds (purple), 10 seconds (green), 30 seconds (red), 30 minutes (blue) post mixing. Calcite infrared active bond vibrational modes of, v3 (1400 cm−1), v1 (1087 cm−1), v2 (877 cm−1), and v4 (714 cm−1) are seen.
Figure 8:
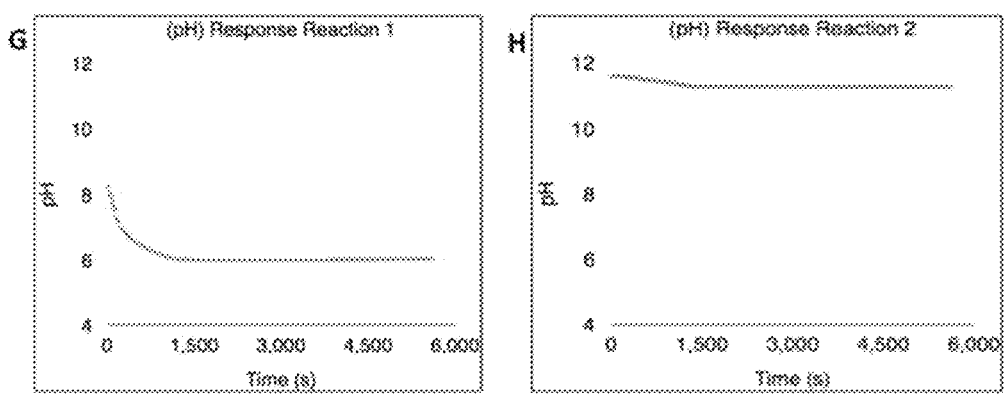

The pH was recorded in a time resolved manner using an OrionStar A215 pH meter with an Orion 8157BNUMD Ross Ultra pH/ATC Probe. Data was logged using StarCom 1.0 sampling every 3 seconds while dosing 0.25 M $CaCl_2$ solution (Sigma, Lot #BCBL2738 & Deionized Water) into 0.5 M $NaHCO_3$ solution (Aqua Solutions, Lot #319302 & Deionized Water) and 0.5 M $Na_2CO_3$ (Sigma Lot #SLBD98664)(FIG. 8, panel G and FIG. 8, panel H)

K. Synthesis of Calcium Carbonates Materials with Desirable Properties

Carbonate was produced by mixing $CaCl_2$ (aq) and $NaHCO_3$ (aq) at a molar ratio of 1:2, similar to what is described in the Timer-resolved pH measurement section of the Material and Methods. The precipitate was then pressurized using a carver press to 20,000 lbf and allowed it to dwell for 30 minutes. The compact calcium carbonate was then placed in a humidity chamber (Fisher Scientific Isotemp Oven Model 615F, made 100% humid with water) for 7 days at 40° C. Finally, the sample was cured for 12 days in 1 M $Na_2CO_3$ solution, which was kept in a water bath to maintain the temperature at 40° C.

L. Solar Reflectance Measurements and Calculations

Solar reflectance spectra were collected using Perkin-Elmer Lambda 950 UV-Vis-NIR spectrometer loaded with 150 mm Integrating Sphere. The data were recorded with 5 nm interval using UV Winlab 6.0.2 software. The solar reflectance was calculated based on clear sky Air Mass 1 Global Horizontal (AM1GH) (R. Levinson, H. Akbari, P. Berdahl, Measuring solar reflectance—Part I: Defining a metric that accurately predicts solar heat gain. Solar Energy 84, 1717 (2010); R. Levinson, H. Akbari, P. Berdahl, Measuring solar reflectance—Part II: Review of practical methods. Solar Energy 84, 1745 (2010)) and ASTM Standard E892-87 terrestrial solar irradiance (ASTM Standard E892-87 for Terrestrial Solar Spectral Irradiance at Air Mass 1.5 for a 37-Deg tilted surface. (ASTM International, West Conshohocken, Pa., 1992)) to compute solar (averaged over range 300-2500 nm), UV (averaged over range 300-400 nm), visible (averaged over range 400-700 nm), and near-infrared (averaged over range 700-2500 nm) reflectance.

M. Life Cycle Analysis

Calculations of lb $CO_2$/$yd^3$ mortar were based on the assumption that an average of 2,044 lb of $CO_2$ is emitted for every 2,205 lb of Ordinary Portland Cement (OPC) produced in the U.S., depending on fuel type, raw ingredients, and the energy efficiency of the cement plant (National Ready-Mix Concrete Association, Concrete CO2 Fact Sheet, based on the most recent survey of Portland Cement Association members. (February 2012)) (essentially 1:1 $CO_2$: OPC produced). Therefore ASTM C109/C109M mortar cube mix design has 1,057 lb $CO_2$/yd$^3$ mortar (extrapolated from mix design detailed in FIG. 4, panel B); this also assumes no $CO_2$ contributions from the water and aggregate components of the mix design. When a carbon-reducing LCP liquid that contains 1 wt % $CO_2$ is used as a complete water replacement in the Ordinary mix design, the lb $CO_2$/yd$^3$ mortar is reduced by 5 lb $CO_2$. When the carbon-reducing liquid is used in combination with a 15% replacement of OPC by interground (IG) limestone, the lb $CO_2$/yd$^3$ mortar is reduced to 898 lb $CO_2$/yd$^3$ (from 1057 lb $CO_2$/yd$^3$). This is due to the 1 wt % $CO_2$ in the liquid and the 15% offset of $CO_2$ that would have otherwise come from the manufacturing of OPC.

II. Discussion

Here, we report the discovery of acidic bicarbonate-rich LCP in several natural solutions like seawater, and suggest that it may be used as a $CO_2$ sink in carbon sequestration. We provide evidence that the bicarbonate-rich LCP does not require supersaturated conditions with respect to any solid divalent inorganic carbonate and is neither mineral specific nor transient, but rather, is a fundamental electrolyte behavior exhibited by bicarbonate ($HCO_3^-$) ions. The resulting potential for additional control over the bicarbonate-rich LCP droplets allow for a previously unknown means to manipulate solvated inorganic carbon chemistry, such as mechanical separation and concentration in the solution state, and the production of synthetic minerals with superior properties. This discovery has far-reaching ramifications in such fields as oceanography, environmental sciences, material sciences and large-scale anthropogenic carbon dioxide separation and sequestration via carbonate mineralization.

We report here droplets of an apparent LCP in a variety of solutions by means of a light scattering technique: nanoparticle tracking analysis (NTA). We analyzed both synthesized inorganic solutions and natural ionic solution also containing organic moieties including, a synthesized inorganic Cretaceous Period seawater composition (FIG. 1, panel A), modern seawater (FIG. 1, panel B), synthesized simple, undersaturated solutions containing monovalent inorganic sodium bicarbonate and sodium chloride ($NaHCO_3$/NaCl), an no divalent cations (FIG. 1, panel C) and solutions of bovine fetal calf serum (FIG. 1, panel D), to demonstrate the ubiquitous nature of the LCP that may exist in a variety of compositions which participate in, and affect chemistry. Note that the natural solutions, modern seawater and serum containing organic moieties (right hand panels B and D) show an abundance of droplets compared to the pure synthesized inorganic solutions (left hand panels A and C).

The LCP droplets range from 0 to 400 nm, with a size distribution and overall count that appears to be environment specific. When divalent ions, particularly $Ca^{2+}$, are present in the solutions, even at near-neutral pH, the $HCO_3^-$ is particularly concentrated in the hyperalkaline LCP phase. This observation may explain the nucleation mechanism that leads to much higher nucleation rates than might be theoretically expected, as well as calcium carbonate polymorph specificity in a way that the absence of such condensation mechanisms do not (P. G. Vekilov, Crystal Growth & Design 10, 5007 (December, 2010)). An example, in FIG. 6, demonstrates how the NTA technique was used to measure the effects of $Mg^{2+}$:$Ca^{2+}$ ratio on the amount of LCP droplets in a sodium bicarbonate solution. The behavior of LCP appears to parallel the prevalence of aragonite vs. calcite precipitation. This is consistent with the observation that biomineralization associated with prolific marine calcifying taxa flourished in the Cretaceous Period, when atmospheric carbon dioxide levels were significantly higher and the ocean would have been hyperalkaline as a result (S. M. Stanley, Chemical Reviews 108, 4483 (2008 Nov. 12, 2008)).

What is particularly fascinating is that bicarbonate-rich LCP forms in the simple, highly undersaturated solution of 100 mM $NaHCO_3$ and 100 mM NaCl shown in FIG. 1, panel C. In contrast to previous studies, this suggests that the condensation is due to a fundamental bicarbonate ion propensity to condense, and not to strong interactions with divalent ions in supersaturated states, with respect to mineral formation. The droplets do not form in bicarbonate-deficient solutions of similar ionic strength such as in 200 mM NaCl (see FIG. 7, panel B), indicating that bicarbonate rich LCP is a fundamental electrolyte behavior that is not specific to a particular biomineral or to a solid nucleation pathway. A stable, acidic, long-lived bicarbonate-rich LCP may serve as a concentrated carbon sink and provide a fundamental chemical mechanism, through manipulation with additives, in which $CO_2$ over a wide range of concentrations could be converted to hyperalkaline droplets of LCP rich in bicarbonate ions and concentrated and manipulated for carbon sequestration processes via carbonate mineralization.

Nuclear magnetic resonance (NMR) spectroscopy has been used in the past to characterize bicarbonate-rich LCPs (M. A. Bewernitz, D. Gebauer, J. Long, H. Coelfen, L. B. Gower, Faraday Discussions 159, 291 (2012)) and early $HCO_3^-$/$CO_3^{2-}$ nucleation behavior (D. Gebauer et al., Angewandte Chemie International Edition 49, 8889 (2010)). The same $NaHCO_3$/NaCl solution analyzed in FIG. 1C was characterized using 1D transverse relaxation measurements in order to identify and analyze the LCP, (see FIGS. 2, panel A and 2, panel B, respectively). The 1D $^{13}$C NMR spectrum in FIG. 2, panel A shows a doublet that is consistent with the presence of two similar, yet non-identical solution states coexisting in equilibrium, e.g., LCP and mother solution. Deconvolution of the two peaks suggests that, over the course of the six-second time average used to acquire the data, approximately 30% of the inorganic carbon in solution has participated in LCP. This is consistent with a long-lasting separate phase, with different chemistry that is not rapidly transient in a way to average out over several seconds. The CPMG $T_2$ relaxation measurement in FIG. 2, panel B demonstrates that the two phases have different $T_2$ relaxation times, re-enforcing the notion that the two peaks are due to $HCO_3^-$ residing in two distinct solution environments. The apparent bicarbonate-rich LCP phase has a shorter $T_2$ relaxation than the mother solution suggesting that it is more viscous and/or more concentrated than the mother solution. The results from NMR experiments support the NTA data and again demonstrate the presence of a LCP in the absence of divalent cations, in solutions that are undersaturated with respect to any solid phases, e.g., $NaHCO_3$. The data support the thesis that LCPs are not a specific step in the nucleation process, but rather a ubiquitous and fundamental electrolyte behavior occurring in solutions containing $HCO_3^-$.

Figure 2:
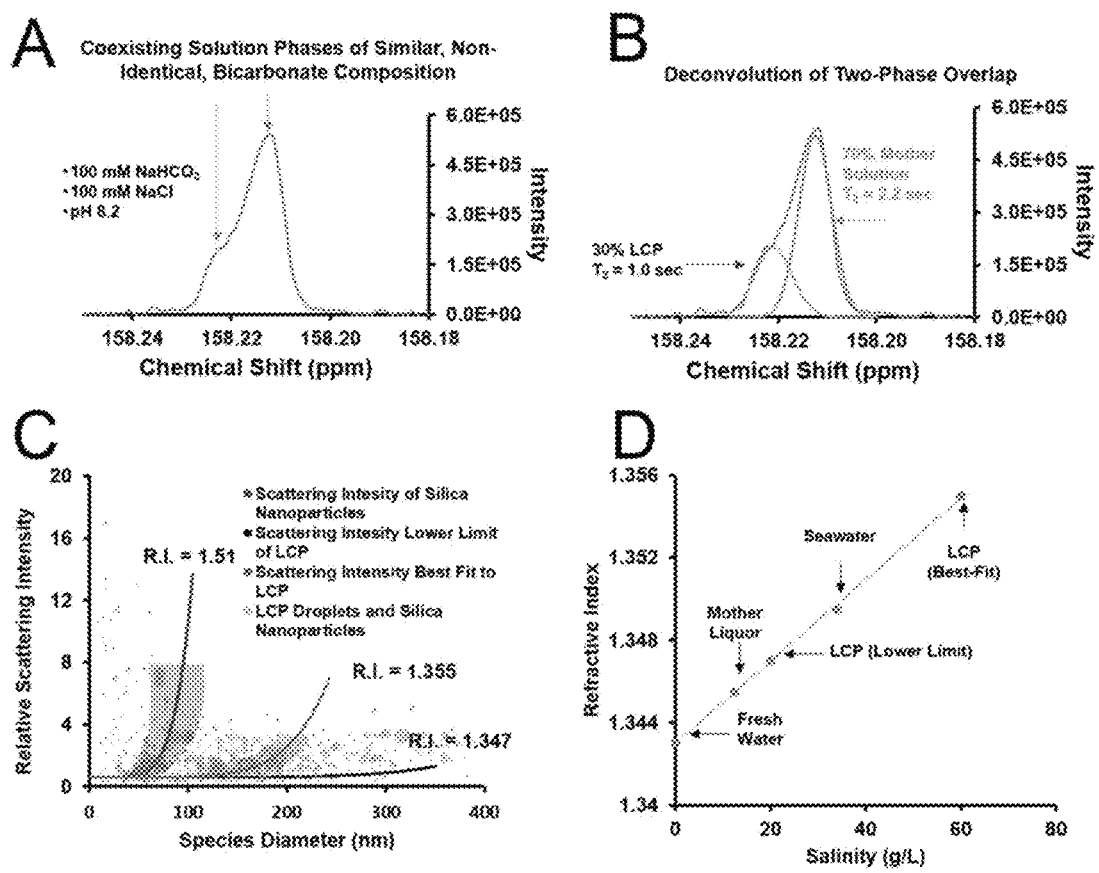
FIG. 2. Results from nuclear magnetic resonance and nanoparticle tracking analysis indicate that the bicarbonate-rich LCP behaves as a two-phase, solution-state system. (A) $^{13}C$ NMR data of a 100 mM $NaHCO_3$ (100% $^{13}C$-enriched), 100 mM NaCl solution. The shoulder at 158.22 ppm is attributed to the presence of LCP, which has a composition similar to, but not identical to that of the mother solution. The small difference in chemical shift may be due to differences in pH between the LCP and mother solution. To ensure that the electrolyte behavior is un-adulterated, no chemical shift standard was added to the solution. (B) Deconvolution of the overlapping peaks in the $^{13}C$ NMR spectrum in (A) suggests that approximately 30% of the inorganic carbon has participated in LCP over 6.35 seconds (acquisition time) and 70% has not, remaining in the mother liquor phase for the duration. The $T_2$ relaxation of the peaks was obtained through a CPMG-NMR method and determined to be 1.0 and 2.2 for the LCP and mother liquor phase, respectively, values that are consistent with solution states of solvated ions. The lower $T_2$ value for the LCP is consistent with the LCP being a more concentrated, viscous solution relative to the mother solution. (C) The plot shows relative light scattering intensities of different sized species in solution; larger data points represent improved statistical certainty due to longer Brownian motion monitoring. $SiO_2$ nanoparticles were used as a calibration standard and the displayed curve effectively modeled the refractive index of the small amount of them that were added to the reaction (red line, RI=1.51, shaded red area). The statistically relevant (large, green shaded) data points in the suspected LCP regime were modeled (dark green line, RI=1.355) and a lower-limit fit of scattering intensities of LCP droplets (black line, RI=1.347) were modeled as well. The range of R.I. values for the LCP droplets are consistent with saltwater solutions because they are only a few hundredths larger than that of fresh water alone. (D) The linear relationship between saltwater salinity (g/L) and the RI is shown and is taken from literature (23). According to the relationship, LCP in this solution has a lower-limit salinity of approximately 20 g/L but could be as high as approximately 60 g/L or more which is much more concentrated than the mother solution from which they are derived.

Because NTA has proven a successful and novel method of providing estimated refractive indices (RI) of unknowns in earlier studies (Bewernitz et al., Id.; V. Filipe, A. Hawe, W. Jiskoot, Pharm. Res. 27, 796 (2010)), light scattering measurements by NTA were used here to calculate a first-order approximation of the RI of bicarbonate-rich LCP droplets. The results are shown in FIG. 2. In a 100 mM NaHCO$_3$/NaCl solution, the bicarbonate-rich LCP droplets show a low intensity, polydisperse size distribution. This suggests that the droplets have a larger RI than the mother solution and that their RI is a range rather than a single value. FIG. 2, panel C shows a fit to a group of statistically relevant data points, given their increased certainty indicated by larger data points, giving a calculated RI of 1.355 for the LCP droplets. To encompass the range of the apparent diverse values of RI for bicarbonate-rich LCP, a lower-limit fit, inclusive of all the LCP droplets, gives a RI of 1.347. It must be stressed that the RI values attributed to LCP are consistent with saltwater indices and not with solid NaCl, NaHCO$_3$, or Na$_2$CO$_3$; all of which are massively undersaturated in the solution. Salinity of the bicarbonate-rich LCP was estimated by plotting saltwater RI vs. salinity obtained from previous work (X. Quan, E. S. Fry, Applied Optics 34, 3477 (1995)), and is shown in FIG. 2, panel D. The values are consistent with a bicarbonate-rich LCP, having salinity between 20 and 60 g/L as compared to the mother solution with salinity of 15 g/L. In other words, the bicarbonate-rich LCP has a salinity of four times greater (or more) compared to the mother solution. This is consistent with a previous report that described LCP as a condensed solution state of bicarbonate and to the best of our knowledge, represents the first attempt to estimate the salinity of bicarbonate-rich LCP droplets using a novel technique.

Figure 3:
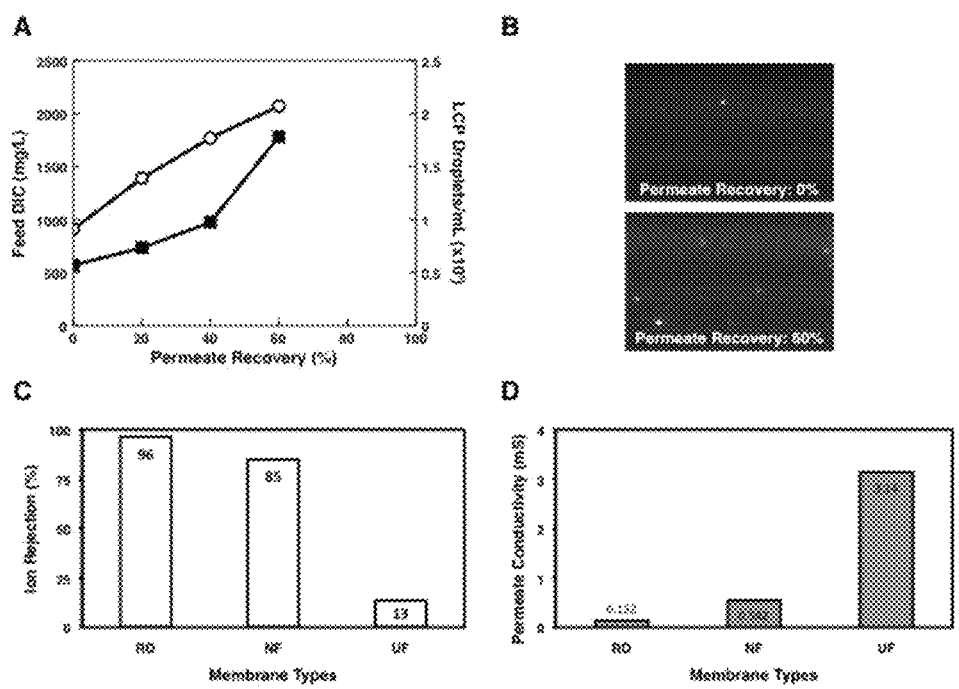
FIG. 3. Bicarbonate-rich LCP displays a droplet moiety allowing it to be filtered and manipulated. (A) Using a nanofiltration membrane, overall DIC (bicarbonate) is concentrated along with bicarbonate-rich LCP in an initial solution of 50 mM NaHCO$_3$ and 50 mM KCl in a way that is unusual for small, monovalent ions suggesting that the bicarbonate ion is existing in a larger moiety, such as the bicarbonate-rich LCP. (B) Nanoparticle tracking analysis (NTA) scattering stillshots demonstrate the concentration of bicarbonate-rich LCP. (C) Rejection (concentration) of sodium bicarbonate (NaHCO$_3$) using current membrane technologies allowing for manipulation and concentration of the CO$_2$-derived bicarbonate-rich LCP. The sudden drop in ion rejection of bicarbonate suggests that the LCP droplet moiety has a size larger than 10 nm and begins to pass through the membrane. Three types of membranes: reverse osmosis (RO 0.1-1 nm pore size, MWCO ~0), nanofiltration (NF 1-10 nm pore size, MWCO <1000) and ultrafiltration (UF 10-100 nm pore size, MWCO >1000), where used to concentrate the same solution used in part A. Large rejections were seen until a membrane with pore sizes larger the 10 nm were used, after which the bicarbonate moieties begin to pass through the membrane; this is consistent with the magnitude of size predicted by the NTA. (D) The overall ionic strength of permeate solutions passed through each of the various membranes verifies the sudden passage of bicarbonate ions once the pore diameter becomes larger than the bicarbonate-rich LCP.

Since the resulting bicarbonate-rich LCP droplets act like intact larger moieties rather than individual ions, they can be mechanically separated and recovered from their bulk solution (see FIG. 3). Nanofiltration (NF) is an established water softening membrane technology that has proven to be especially effective at concentrating bicarbonate-rich LCP. Although LCP can be concentrated with tighter reverse osmosis (RO) membrane elements as well, NF elements require much less mechanical load and can achieve similar levels of LCP rejection as is obtained by RO. To demonstrate, an aqueous solution of 50 mM sodium bicarbonate/potassium chloride (NaHCO$_3$/KCl) containing bicarbonate-rich LCP was concentrated using membrane filtration with various membranes with different pore sizes. The results are shown in FIG. 3.

FIG. 3, panel A shows that as the NaHCO$_3$/KCl solution is concentrated with a NF element (pore size diameter <2 nm), the overall dissolved inorganic carbon (DIC= bicarbonate in FIG. 3, panel A) increases, as does the amount of bicarbonate-rich LCP droplets (NTA images, FIG. 3, panel B). The rejection (concentration) properties of NaHCO$_3$ in FIG. 3, panel C and FIG. 3, panel D suggest that the bicarbonate-rich LCP droplets are larger, on average, than 10 nm due to their rejection by the NF and RO, but not by ultrafiltration. This observation is consistent with the size distribution measured by NTA in FIG. 1, panel C as being several dozen nm in diameter. The NF technology appears to be a new approach to aqueous HCO$_3^-$ chemistry, by means of mechanics to separate and manipulate the solution. The above data points to the bicarbonate-rich LCP as a mechanism for sequestering CO$_2$ into a capture solution and concentrating it, i.e., the NF process is one that would allow for concentration of bicarbonate-rich LCP droplets in carbon capture solutions derived from flue gas. LCP being bicarbonate-rich suggests that, with the addition of Ca$^{2+}$, solid nucleation of CaCO$_3$ may proceed through a biomimetic bicarbonate pathway. This is similar to the proposed mineralization process used by calcifying aquatic invertebrates that form mineralized skeletons, shown in equation (1), where CO$_2$ is converted to solid carbonate material via the reaction of Ca$^{2+}$ with two equivalents of HCO$_3^-$ ($\Delta G$=−27.3 kJ mol$^{-1}$).

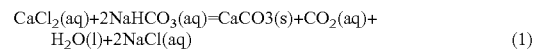
(1)

CaCO$_3$ formation appears to follow this pathway when it is occurring in solutions containing significant amounts of bicarbonate-rich LCP. For results supporting the formation of CaCO$_3$ through equation (1) at pH's ranging from 6 to 8.5 and achieving yields approaching 90% for both CaCO$_3$ and CO$_2$, see FIG. 8 in the Supplemental Materials. Additionally, ATR studies supporting this behavior in real time are shown in FIG. 8.

The reaction in equation (1) occurs at near-neutral pH and has broad enabling implications for large-scale CO$_2$ sequestration and production of synthetic inorganic carbonate solids as compared to the traditional approach, seen in equation (2), which involves reacting Ca$^{2+}$ with CO$_3^{2-}$, equation (2) ($\Delta G$=−49.87 kJ mol$^{-1}$).

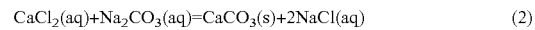
(2)

The necessity of maintaining a high pH of the system to mineralize through equation (2) is a major limitation due to the prohibitive expense of producing/supplying large amounts of high pH alkalinity. Mineralization through equation (1) reduces the energy/expense due to the requirement to maintain a pH neutral environment that favors the bicarbonate ion (pH 6.5-8.5). The drawback is that the reaction in equation (1) produces an equivalent of pure stream CO$_2$ for every equivalent of CaCO$_3$ produced. This may prove desirable, however, in the pursuit of geological subsurface sequestration. Currently the primary solution for managing carbon emissions on a world-wide sustainable basis, geologic sequestration requires that CO$_2$ be in a substantially pure form, however, as it must be compressed and liquefied for transport and injection into subsurface geological reservoirs, which requires subsequent monitoring. The most significant quantities of carbon emissions originate from Portland cement plants, coal- and natural gas-fired power plants, all of which emit dilute streams of CO$_2$, but contain mainly nitrogen. Current state-of-the-art technologies to purify CO$_2$ from industrial flue gas, e.g., amine scrubbing (G. T. Rochelle, Science 325, 1652 (2009)), are energy intensive primarily due to the stripping of pure CO$_2$ out of the capture solution. At a coal-fired power plant, for example, purifying the CO$_2$ from a flue stream can require more than 35% of the electricity generated by the plant. In the context of mineralizing CaCO$_3$ through the reaction in equation (1), however, where two equivalents of CO$_2$ (as HCO$_3^-$) produce one equivalent of pure CO$_2$ and one equivalent of sequestered CO$_2$ (as CaCO$_3$ for building materials), such energy intensive loads might be circumvented.

Figure 4:
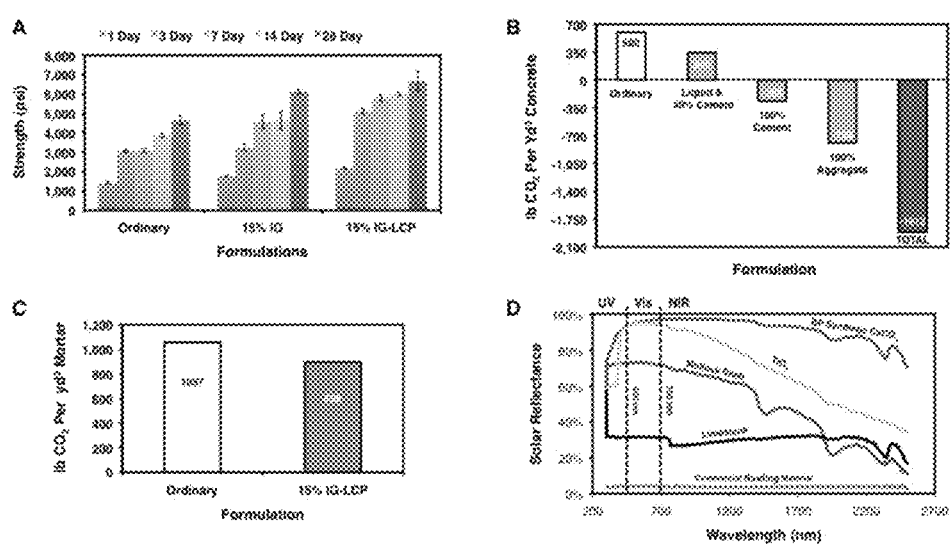
FIG. 4. CaCO$_3$ materials made through the reaction shown in equation (1) demonstrate desirable material mechanical properties and high solar reflectance. (A) Compressive strength data at 1-, 3-, 7-, 14- and 28-days for three different mortar cube formulations: Ordinary portland cement or OPC, (no OPC replacement), 15% IG and 15% IG-LCP, where IG=interground limestone, LCP=liquid. The addition of IG limestone similar to what is produced through reaction (1) and a combination of IG and bicarbonate-rich LCP lead to early cure times and strengths that are superior to the currently used ordinary mix design. (B) Life cycle analyses of different concrete formulations where traditional components are replaced by novel carbon-reducing components. The formulations are based on a generic "moderate-strength" mix design. As Portland cement is replaced by synthetic limestone produced from sequestered CO$_2$ via the reaction in equation (1), the carbon footprint of concrete drops significantly, even going negative as the concrete becomes a CO$_2$ sequestering sink. (C) Life cycle analyses of mortar specimens in FIG. 4A, where 15% OPC was replaced by quarried limestone and water was replaced by LCP liquid that contained 1% CO$_2$ by weight. Even a modest amount of limestone replacement to mortar formulations utilizing bicarbonate-rich LCP solutions results in a significant reduction of the carbon footprint while improving cure time. (D) Solar reflectance (SR) spectra comparing Blue Planet synthetic CaCO$_3$ (blue line), technical grade TiO$_2$ (yellow line), *Acmaea mitra* mollusk shell (red line), Calera limestone (black line) and GAF Quickstart roofing material (green line). The CaCO$_3$ material precipitated via the reaction in equation (1) displays superior albedo properties, having high solar reflectance across the entire solar spectrum, a property with significant implications with regard to energy efficiency in cool materials.
Figure 5:
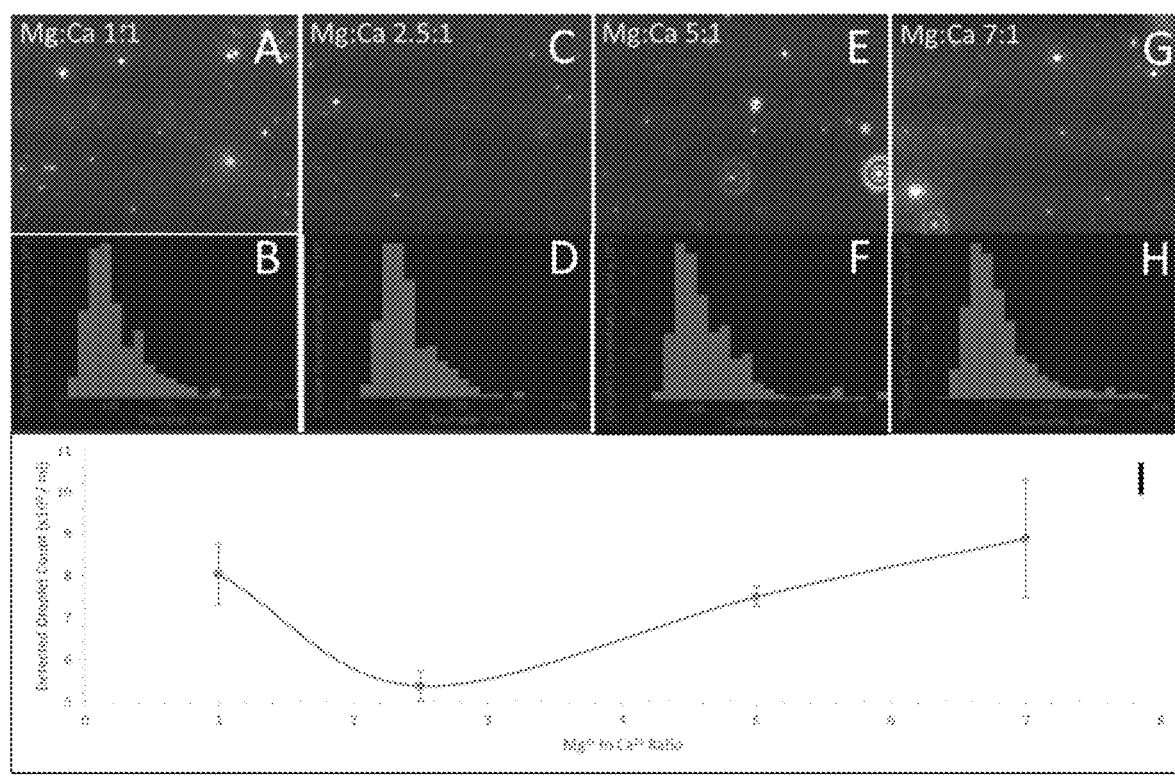
FIG. 5. The Mg/Ca ratio affects bicarbonate-rich liquid condensed phase droplets. The effect of changing [Mg$^{2+}$]:[Ca$^{2+}$] ratio to the formation of bicarbonate-rich liquid condensed phase (LCP) droplets was measured by means of nanoparticle tracking analysis (NTA) in solutions containing 0.2 mM divalent ions and 50 mM sodium bicarbonate. (A, C, E, G) A still-shot of the scattering projection of solutions containing [Mg$^{2+}$]:[Ca$^{2+}$] ratios of 1:1, 2.5:1, 5:1, and 7:1, respectively. (B, D, F, and H) The size histograms of the LCP droplets obtained by NTA for A, C, E, and G, respectively. (I) The LCP droplet count as detected by the nanoparticle tracking analyzer vs. the [Mg$^{2+}$]:[Ca$^{2+}$] ratio in solution. The data was collected in triplicate and averaged with a standard deviation of error in either direction. We see that the presence of divalent ions seems to promote the formation of large, robust and detectable LCP as compared to solutions containing only monovalent ions (see FIG. 1C). The size distribution of the droplets are very similar for all cases, however the amount of LCP droplets seems to change depending on the [Mg$^{2+}$]:[Ca$^{2+}$] ratio as shown in I. At solutions near 1:1 ratio (similar to Cretaceous seawater), there are many droplets, but as the solution increases in [Mg$^{2+}$]:[Ca$^{2+}$] ratio, the amount of droplets drops suddenly and then increases until, at a [Mg$^{2+}$]:[Ca$^{2+}$] ratio of 7:1 (similar to modern seawater). This effect on the LCP by [Mg$^{2+}$]:[Ca$^{2+}$] may have a role in describing ocean acidification, explaining the extreme calcium carbonate deposition during the Cretaceous era, and even explaining why calcite forms near 1:1 ratios, but aragonite forms at higher ratios (5:1 and 7:1, shown on the plot in FIG. S1I).

Ideally, the synthetic CaCO$_3$ produced in the process will be used in the built environment as limestone aggregate for concrete, asphalt and road base. A formulation of water, cement and aggregate constituents, concrete is the most used building material in the world and represents the largest potential sustainable reservoir for CO$_2$ sequestration. The carbon footprint of a cubic yard (yd$^3$) of concrete, however, is large—averaging ¾ ton of CO2 per ton of cement—and is largely due to the energy intensive process of manufacturing ordinary Portland cement (OPC) (National Ready-Mix Concrete Association, Concrete CO2 Fact Sheet, based on the most recent survey of Portland Cement Association members. An average of 2,044 lb of CO2 is emitted for every 2,205 lb of ordinary Portland cement (OPC) produced in the U.S., depending on fuel type, raw ingredients and the energy efficiency of the cement plant, (2012)). It is of significant interest to replace traditional components of concrete with novel, carbon-reducing components. When used in formulations where OPC is replaced by, e.g., natural limestone, or preferably, synthetic limestone derived from an emission source, and bicarbonate-rich LCP solutions are incorporated, the new formulation has a significant impact on the carbon footprint per $yd^3$ concrete (see FIG. 4B). This includes the offset of $CO_2$ that would have otherwise come from the manufacturing of OPC, as well as storage of $CO_2$ sequestered in the concrete. We have verified that carbon-reducing components can be substituted into mortar formulations with increased performance. FIG. 4, panel A shows the time-dependent compressive strength data for a series of mortar specimens. One mortar formulation that substituted natural limestone for OPC, cured faster than the ordinary mortar formulation. The limestone, similar to the synthetic $CaCO_3$ product in equation (1), was interground (IG) with the OPC to maximize reactive surface area. In a second iteration, ordinary mix water of the mortar formulation was completely replaced by concentrated bicarbonate-rich LCP solution, and lead to even faster curing times. The carbon footprint of the mortar specimens that used carbon-reducing components is reduced significantly compared to the ordinary mortar formulation (FIG. 4, panel C).

In addition to being valuable in concrete formulations, the carbonate minerals produced from LCP solutions via the reaction in equation (1) exhibit unusually high solar reflectance (SR) relative to known commercial and natural materials (FIG. 4, panel D). High SR is desirable for commercial cool roofing technologies as a means to mitigate heat island effects in urban areas (H. Akbari, S. Menon, A. Rosenfeld, Climatic Change 95, 275 (2009); M. Santamouris, A. Synnefa, T. Karlessi, Solar Energy 85, 3085 (2011)), reducing the convective and radiative thermal gain of a surface and significantly reducing energy consumption and costs associated with cooling structures. Calcium carbonate material precipitated via the reaction in equation (1) displays superior albedo properties, having high solar reflectance across the entire solar spectrum, a property with significant implications with regard to energy efficiency in cool materials. The synthetic $CaCO_3$ even outperforms $TiO_2$, the current standard for albedo against which materials are rated.

Electrolyte solutions deviate from ideal behaviors due to a decrease in the activity of individual ions. Many such mechanisms are suspected to contribute, at least in part, to the loss of activity. These include Debye-Hückel screening, ion-pairing, and the recently discovered prenucleation clustering (PNC) (D. Gebauer, A. Volkel, H. Coelfen, Science 322, 1819 (2008)). LCP is an additional phenomenon that can account for a portion, or even the majority of, the non-ideality of concentrated salt solutions, simply by altering ion activity due to the incorporation of ions into an LCP phase. The ions present in a separate LCP phase do not contribute to thermodynamic measurements of the "mother solution" leading to a lowering the activities of those species and a change in the mother solution equilibrium (see FIG. 9). This may lead to mis-interpretations regarding the state of the global system if the two-phase system is not considered. In other words, the activity of a specific ion or solvated species may drop, not because its coefficient changed, but because it actually left the system to another phase. Explicit accounting for LCP will simplify our thermodynamic and kinetic models of electrolyte solutions and provide new insights into previously unexplained behaviors. For additional data and experiments that correlate the LCP to non-ideal behavior, see FIGS. 10 and 11.

In light of these findings, we show an approach to modeling salt solution properties by considering the formation of a two-phase LCP system. This would be beneficial to all fields which study electrolyte behaviors but particularly in the field of oceanography. It is currently assumed that carbon in the ocean is comprised of a single phase in equilibrium with Earth's atmosphere and that by knowing any two variables ($P_{CO2}$, pH, dissolved inorganic carbon (DIC) and alkalinity, for a given temperature, salinity and pressure), all the other system parameters can be calculated. This does not hold true for a multiphase system. Recent studies of calcium carbonate ($CaCO_3$) solubility and formation suggest that fundamental electrolyte behaviors, such as PNC's and LCP (D. Gebauer, H. Coelfen, Nano Today 6, 564 (2011)) affect carbonate chemistry. Assumptions surrounding the negative effect of additional atmospheric $CO_2$ leading to ocean acidification (R. E. Zeebe, Annual Review of Earth and Planetary Sciences 40, 141 (2012); B. Honisch et al., Science 335, 1058 (Mar. 2, 2012, 2012)) may need to be re-evaluated. The effect may not be strictly the reduction of the solubility of CaCO3 but may affect the bicarbonate pathway toward $CaCO_3$ (J. B. Ries, A. L. Cohen, D. C. McCorkle, Geology 37, 1131 (Dec. 1, 2009, 2009)). It may be more accurate to refer to the process as ocean alkalinization (increase in bicarbonate) rather than ocean acidification. This may explain the explosion of biogenic $CaCO_3$ formation that occurred during the Cretaceous Period when atmospheric $P_{CO2}$ was much larger than it is today. The partial pressure of $CO_2$ ($P_{CO2}$) in Earth's atmosphere has varied considerably over Phanerozoic Period. Oceanic $HCO_3^-$ concentration and alkalinity of the ocean would have increased with increasing $P_{CO2}$ leading to higher bicarbonate-rich LCP and more biomineral formation through that pathway. This is consistent with recent studies (C. P. Jury, R. F. Whitehead, A. M. Szmant, Global Change Biology 16, 1632 (2010); M. D. Iglesias-Rodriguez et al., Science 320, 336 (Apr. 18, 2008, 2008)). In light of the LCP discovery in the ocean, these seemingly disparate lines of evidence from modern oceanography and the geologic record, correlate with regard to optimal conditions for $CaCO_3$ formation from bicarbonate solutions.

Having demonstrated the potential to store sequestered $CO_2$ in LCP, concentrate LCP, and use the concentrated solution to precipitate materials with superior properties, we show that the findings presented here may be utilized in an approach to carbon capture and sequestration as a four-stage process (see process flow diagram in FIG. 13). Carbon capture solutions are created using a membrane-derived alkali recovery process driven by ion concentration gradients such as the ones readily available as cooling waters for power plants or waste from desalination plants. This capture solution is combined with a $CO_2$ emission source in a gas-liquid contactor to form $HCO_3$ solutions containing hyperalkaline, bicarbonate-rich LCP droplets. At inland locations, geologic brines in sedimentary basins available as produced waters contain a $Mg^{2+}:Ca^{2+}$ ratio more similar to Cretaceous Period seawater compositions than modern seawater. Combination of concentrated bicarbonate-rich LCP with hard $Ca^{2+}$ brine solution via the reaction in equation (1) results in the formation of synthetic $CaCO_3$ for use as, e.g., building materials described above, and the concomitant evolution of pure $CO_2$, for use in geological subsurface sequestration. If, for example, the process were fitted to a 500 MW coal-fired power plant, 9,410 tons per day (TPD) of solid $CaCO_3$ mineral and 4,138 TPD pure $CO_2$ would be produced, assuming 52% recovery of $CO_2$ (see FIG. 13 for detailed metrics at each stage of the process). The energy consumption lies mainly in pumping the water required for the process.

The approach described in this report is comprehensive in that it (i) captures and permanently sequesters $CO_2$ from emission point sources, producing large scale commodity material in the form of inorganic carbonates for the built environment, an approach that provides a carbon sink large enough to manage the $CO_2$ problem and (ii) produces pure stream $CO_2$ for efficient subsurface geological storage. Many studies remain to further understand and characterize the novel bicarbonate-rich LCP. Given the recent change in U.S. policy mandating reduced carbon emissions, we felt that reporting the existence and potential carbon sequestration implications of bicarbonate-rich LCP to the scientific community will stimulate further work studying the carbon sequestration potential of LCP across all scientific disciplines in a way that may help promote full compliance with the new carbon mandates.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system for sequestering $CO_2$ from a $CO_2$ containing gas, the system comprising:
    a source of the $CO_2$ containing gas;
    a source of an aqueous medium;
    a reactor configured to:
        contact the $CO_2$ containing gas with the aqueous medium under conditions sufficient to produce a bicarbonate rich product; and
        produce a solid carbonate composition and a product $CO_2$ gas from the bicarbonate rich product; and
    an injector configured to inject the product $CO_2$ gas in a subsurface geological location.

2. The system according to claim 1, wherein the $CO_2$ containing gaseous stream is a multicomponent gaseous stream.

3. The system according to claim 1, wherein the bicarbonate rich product comprises droplets of a liquid condensed phase (LCP) in a bulk liquid.

4. The system according to claim 1, wherein the $CO_2$ containing gas is contacted with the aqueous medium in the presence of a catalyst that mediates the conversion of $CO_2$ to bicarbonate.

5. The system according to claim 1, wherein the solid carbonate composition is produced without the use of an alkalinity source.

6. The system according to claim 1, wherein the product $CO_2$ gas comprises substantially pure $CO_2$.

7. The system according to claim 1, further comprising compressing the product $CO_2$ gas prior to injecting the product $CO_2$ gas in the subsurface geological location.

8. The system according to claim 1, wherein the subsurface geological location is a subterranean location.

9. The system according to claim 1, wherein the method produces a mole of purified $CO_2$ for every two moles of $CO_2$ removed from the gaseous stream.

10. The system according to claim 1, wherein the aqueous medium is a bicarbonate buffered aqueous medium.

11. The system according to claim 10, wherein the bicarbonate buffered aqueous medium has a pH ranging from 8 to 10.

12. The system according to claim 1, wherein the $CO_2$ containing gas is obtained from an industrial plant.

13. The system according to claim 12, wherein the $CO_2$ containing gas is a flue gas.

14. The system according to claim 1, wherein the system is configured to produce a commodity from the solid carbonate composition.

15. The system according to claim 14, wherein the commodity is a building material.

16. The system according to claim 15, wherein the building material is an aggregate.

17. The system according to claim 16, wherein the building material is a cement or supplemental cementitious material.

* * * * *